US009639892B2

(12) United States Patent
Votaw et al.

(10) Patent No.: US 9,639,892 B2
(45) Date of Patent: *May 2, 2017

(54) ACTIVITY REVIEW FOR A FINANCIAL AND SOCIAL MANAGEMENT SYSTEM

(71) Applicant: BANK OF AMERICA CORPORATION, Charlotte, NC (US)

(72) Inventors: Elizabeth S. Votaw, Potomac, MD (US); Laura Corinne Bondesen, Charlotte, NC (US); Matthew A. Calman, Charlotte, NC (US); Katherine Dintenfass, Charlotte, NC (US); Candice Michelle Jones, Charlotte, NC (US); Charles Karim Aweida, Broomfield, CO (US); Parker Holt Bossier, Metairie, LA (US); Rebecca A. Chen, Pittsburgh, PA (US); Nandhita Kumar, Sunnyvale, CA (US); Min Zhao, Sunnyvale, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,440

(22) Filed: Feb. 29, 2016

(65) Prior Publication Data

US 2016/0300299 A1 Oct. 13, 2016

Related U.S. Application Data

(63) Continuation of application No. 14/032,653, filed on Sep. 20, 2013, now Pat. No. 9,324,115.

(51) Int. Cl.
*G06Q 40/00* (2012.01)
*G06Q 50/00* (2012.01)
(Continued)

(52) U.S. Cl.
CPC ............. *G06Q 40/00* (2013.01); *G06Q 40/02* (2013.01); *G06Q 50/01* (2013.01); *H04L 43/04* (2013.01);
(Continued)

(58) Field of Classification Search
CPC .... G06Q 30/02; G06Q 50/01; G06Q 30/0261; G06Q 30/0631; G06F 17/30598; G06F 21/6245; G06F 17/30241
(Continued)

(56) References Cited

U.S. PATENT DOCUMENTS 3,026,370 A 3/1962 Barnard
6,026,370 A 2/2000 Jermyn
(Continued)

OTHER PUBLICATIONS

Related U.S. Appl. No. 14/032,464, filed Sep. 20, 2013.
(Continued)

*Primary Examiner* — Jay Morrison
*Assistant Examiner* — Ken Hoang
(74) *Attorney, Agent, or Firm* — Michael A. Springs; Moore & Van Allen PLLC; W. Kevin Ransom

(57) ABSTRACT

Embodiments of the invention comprise systems, computer program products, and methods for a financial and social management system that provides improved tracking and management related to how, where, when, and with whom a user enters into activities. The financial and social management system captures activity information and images from various sources of information, including but not limited to social networking accounts, e-receipts, location determination devices, and the like, and associates the activity information and images with the activities. The financial and social management system aggregates the activity information for a number of activities based on the location, user, entity, category, cost, time period, or the like
(Continued)

and displays the aggregated activity information in an activity review interface. The financial and social management system may supplement the aggregated activity information with educational data.

6 Claims, 20 Drawing Sheets

(51) Int. Cl.
  *G06Q 40/02* (2012.01)
  *H04L 12/26* (2006.01)
  *H04L 29/08* (2006.01)
  *H04W 64/00* (2009.01)

(52) U.S. Cl.
  CPC .............. *H04L 67/22* (2013.01); *H04L 67/24* (2013.01); *H04L 67/306* (2013.01); *H04W 64/006* (2013.01)

(58) Field of Classification Search
  USPC ... 705/319, 14.58, 39, 14.53, 1.1, 28, 14.23, 705/14.57, 325, 342, 343, 344, 5, 7.11, 705/14.1, 14.35, 14.45, 14.46, 14.54, 705/14.66, 14.73, 26.2, 26.3, 26.35, 705/26.61, 26.9, 27.1, 332, 4, 44, 7.19, 705/7.29, 7.34; 709/204, 206, 217, 220, 709/224; 726/4, 26, 27, 28, 3, 17, 2, 29, 726/5, 6
  See application file for complete search history.

(56) References Cited

U.S. PATENT DOCUMENTS

| | | |
|---|---|---|
| 7,050,997 B1 | 5/2006 | Wood, Jr. |
| 7,437,330 B1 | 10/2008 | Robinson et al. |
| 7,533,038 B2 | 5/2009 | Blume et al. |
| 7,606,750 B1 | 10/2009 | Hoag et al. |
| 7,624,073 B1 | 11/2009 | Robinson et al. |
| 7,665,658 B2 | 2/2010 | Fields |
| 7,668,821 B1 | 2/2010 | Donsbach et al. |
| 7,756,926 B2 | 7/2010 | Tseng et al. |
| 7,778,933 B2 | 8/2010 | Robinson et al. |
| 7,856,403 B2 | 12/2010 | Venturo et al. |
| 7,966,329 B1 | 6/2011 | Rukonic et al. |
| 8,027,891 B2 | 9/2011 | Preston et al. |
| 8,060,423 B1 | 11/2011 | Rukonic et al. |
| 8,090,656 B2 | 1/2012 | Solomon et al. |
| 8,122,020 B1 | 2/2012 | Donsbach et al. |
| 8,132,720 B2 | 3/2012 | Dyor |
| 8,170,932 B1 | 5/2012 | Krakowiecki et al. |
| 8,180,682 B2 | 5/2012 | Narayanaswami et al. |
| 8,229,806 B1 | 7/2012 | Chapman et al. |
| 8,285,622 B1 | 10/2012 | Rao et al. |
| 8,296,229 B1 | 10/2012 | Yellin et al. |
| 8,332,288 B2 | 12/2012 | Preston et al. |
| 8,335,728 B1 | 12/2012 | Dahodwala et al. |
| 8,346,664 B1 | 1/2013 | Klieman et al. |
| 8,380,590 B1 | 2/2013 | Rukonic et al. |
| 8,429,277 B2 | 4/2013 | Dale et al. |
| 8,447,674 B2 | 5/2013 | Choudhuri et al. |
| 8,478,691 B2 | 7/2013 | Solomon et al. |
| 8,504,423 B2 | 8/2013 | Rotbard et al. |
| 8,559,980 B2 | 10/2013 | Pujol |
| 8,856,121 B1 | 10/2014 | Makki et al. |
| 8,861,804 B1 | 10/2014 | Johnson et al. |
| 8,930,204 B1 | 1/2015 | Igoe et al. |
| 9,112,850 B1 | 8/2015 | Eisen |
| 2001/0037315 A1 | 11/2001 | Saliba et al. |
| 2003/0105710 A1 | 6/2003 | Barbara et al. |
| 2005/0021478 A1 | 1/2005 | Gautier et al. |
| 2005/0033664 A1 | 2/2005 | Moon et al. |
| 2005/0171799 A1 | 8/2005 | Hull et al. |
| 2005/0177385 A1 | 8/2005 | Hull et al. |
| 2007/0032244 A1 | 2/2007 | Counts et al. |
| 2007/0260532 A1 | 11/2007 | Blake, III |
| 2008/0082349 A1 | 4/2008 | Zackrison et al. |
| 2008/0164998 A1 | 7/2008 | Scherpbier et al. |
| 2008/0183579 A1 | 7/2008 | Avner |
| 2008/0262928 A1 | 10/2008 | Michaelis |
| 2009/0125230 A1 | 5/2009 | Sullivan |
| 2009/0164267 A1 | 6/2009 | Banatwala et al. |
| 2009/0216551 A1 | 8/2009 | Chen et al. |
| 2009/0222364 A1 | 9/2009 | McGlynn et al. |
| 2009/0265197 A1 | 10/2009 | Chan |
| 2009/0271287 A1 | 10/2009 | Halpern |
| 2009/0307003 A1 | 12/2009 | Benyamin et al. |
| 2009/0324103 A1 | 12/2009 | Gelfand et al. |
| 2010/0057574 A1 | 3/2010 | Banerjee et al. |
| 2010/0058196 A1 | 3/2010 | Krishnan et al. |
| 2010/0082454 A1 | 4/2010 | Narayanaswami et al. |
| 2010/0153242 A1 | 6/2010 | Preston et al. |
| 2010/0174709 A1 | 7/2010 | Hansen et al. |
| 2010/0211535 A1 | 8/2010 | Rosenberger |
| 2010/0241519 A1 | 9/2010 | Lindahl et al. |
| 2010/0241559 A1 | 9/2010 | O'Connor et al. |
| 2010/0250419 A1 | 9/2010 | Ariff et al. |
| 2010/0250420 A1 | 9/2010 | Ariff et al. |
| 2010/0250421 A1 | 9/2010 | Ariff et al. |
| 2010/0250430 A1 | 9/2010 | Ariff et al. |
| 2010/0268629 A1 | 10/2010 | Ross et al. |
| 2011/0035681 A1 | 2/2011 | Mandel et al. |
| 2011/0054776 A1 | 3/2011 | Petrov et al. |
| 2011/0083101 A1 | 4/2011 | Sharon et al. |
| 2011/0087674 A1 | 4/2011 | Schokking et al. |
| 2011/0099045 A1 | 4/2011 | Carr et al. |
| 2011/0137689 A1 | 6/2011 | Chua et al. |
| 2011/0154223 A1 | 6/2011 | Whitnah et al. |
| 2011/0166911 A1 | 7/2011 | Newman et al. |
| 2011/0196863 A1 | 8/2011 | Marcucci et al. |
| 2011/0208586 A1 | 8/2011 | Joa et al. |
| 2011/0208588 A1 | 8/2011 | Joa et al. |
| 2011/0211764 A1 | 9/2011 | Krupka et al. |
| 2011/0238478 A1 | 9/2011 | Gottfurcht et al. |
| 2011/0249144 A1 | 10/2011 | Chang |
| 2011/0302057 A1 | 12/2011 | Karon et al. |
| 2011/0320294 A1 | 12/2011 | Votaw et al. |
| 2012/0047003 A1 | 2/2012 | Hammad et al. |
| 2012/0059576 A1 | 3/2012 | Lee et al. |
| 2012/0066064 A1 | 3/2012 | Yoder et al. |
| 2012/0130870 A1 | 5/2012 | Shergill et al. |
| 2012/0143674 A1 | 6/2012 | Ziskrout et al. |
| 2012/0143931 A1 | 6/2012 | Rosenberger et al. |
| 2012/0150736 A1 | 6/2012 | Dickerson et al. |
| 2012/0159647 A1 | 6/2012 | Sanin et al. |
| 2012/0191606 A1 | 7/2012 | Milne |
| 2012/0209775 A1 | 8/2012 | Milne |
| 2012/0215597 A1 | 8/2012 | Ross |
| 2012/0215604 A1 | 8/2012 | Canetto |
| 2012/0221388 A1 | 8/2012 | Ross |
| 2012/0229657 A1 | 9/2012 | Calman et al. |
| 2012/0239485 A1 | 9/2012 | Hu et al. |
| 2012/0271691 A1 | 10/2012 | Hammad et al. |
| 2012/0290389 A1 | 11/2012 | Greenough et al. |
| 2012/0290431 A1 | 11/2012 | Tedjamulia et al. |
| 2012/0296768 A1 | 11/2012 | Fremont-Smith et al. |
| 2012/0310764 A1 | 12/2012 | Sinsheimer et al. |
| 2013/0013516 A1 | 1/2013 | Hamilton |
| 2013/0013689 A1 | 1/2013 | Crawford |
| 2013/0030925 A1 | 1/2013 | Calman et al. |
| 2013/0030994 A1 | 1/2013 | Calman et al. |
| 2013/0041819 A1 | 2/2013 | Khasho |
| 2013/0046591 A1 | 2/2013 | Yao |
| 2013/0046602 A1 | 2/2013 | Grigg et al. |
| 2013/0046626 A1 | 2/2013 | Grigg et al. |
| 2013/0046702 A1 | 2/2013 | Ross et al. |
| 2013/0066964 A1 | 3/2013 | Odio et al. |
| 2013/0073377 A1 | 3/2013 | Heath |
| 2013/0073473 A1 | 3/2013 | Heath |
| 2013/0080922 A1 | 3/2013 | Elias et al. |
| 2013/0117184 A1 | 5/2013 | Ciurea |
| 2013/0211913 A1 | 8/2013 | Ross |
| 2013/0246342 A1 | 9/2013 | Faith et al. |

(56) References Cited

U.S. PATENT DOCUMENTS

| | | |
|---|---|---|
| 2014/0081750 A1 | 3/2014 | Hosp |
| 2014/0101012 A1 | 4/2014 | Kuznetsov |
| 2014/0122467 A1 | 5/2014 | Mandel et al. |
| 2014/0207547 A1 | 7/2014 | Cheng |
| 2014/0250126 A1 | 9/2014 | Baldwin et al. |
| 2014/0278212 A1 | 9/2014 | Torgersrud et al. |
| 2014/0279068 A1 | 9/2014 | Systrom et al. |
| 2014/0279303 A1 | 9/2014 | van Dam et al. |
| 2014/0289210 A1 | 9/2014 | Taank et al. |
| 2014/0316829 A1 | 10/2014 | Bumbernick |
| 2015/0019409 A1 | 1/2015 | Vagiri |
| 2015/0032638 A1 | 1/2015 | Dintenfass et al. |
| 2015/0088715 A1 | 3/2015 | Votaw et al. |

OTHER PUBLICATIONS

Related U.S. Appl. No. 14/032,537, filed Sep. 20, 2013.
Related U.S. Appl. No. 14/032,594, filed Sep. 20, 2013.
Related U.S. Appl. No. 14/032,741, filed Sep. 20, 2013.
Related U.S. Appl. No. 14/032,602, filed Sep. 20, 2013.
Related U.S. Appl. No. 14/032,686, filed Sep. 20, 2013.
Related U.S. Appl. No. 14/032,991, filed Sep. 20, 2013.
Related U.S. Appl. No. 14/033,024, filed Sep. 20, 2013.
Related U.S. Appl. No. 14/032,661, filed Sep. 20, 2013.
Related U.S. Appl. No. 14/032,655, filed Sep. 20, 2013.
Related U.S. Appl. No. 14/032,646, filed Sep. 20, 2013.

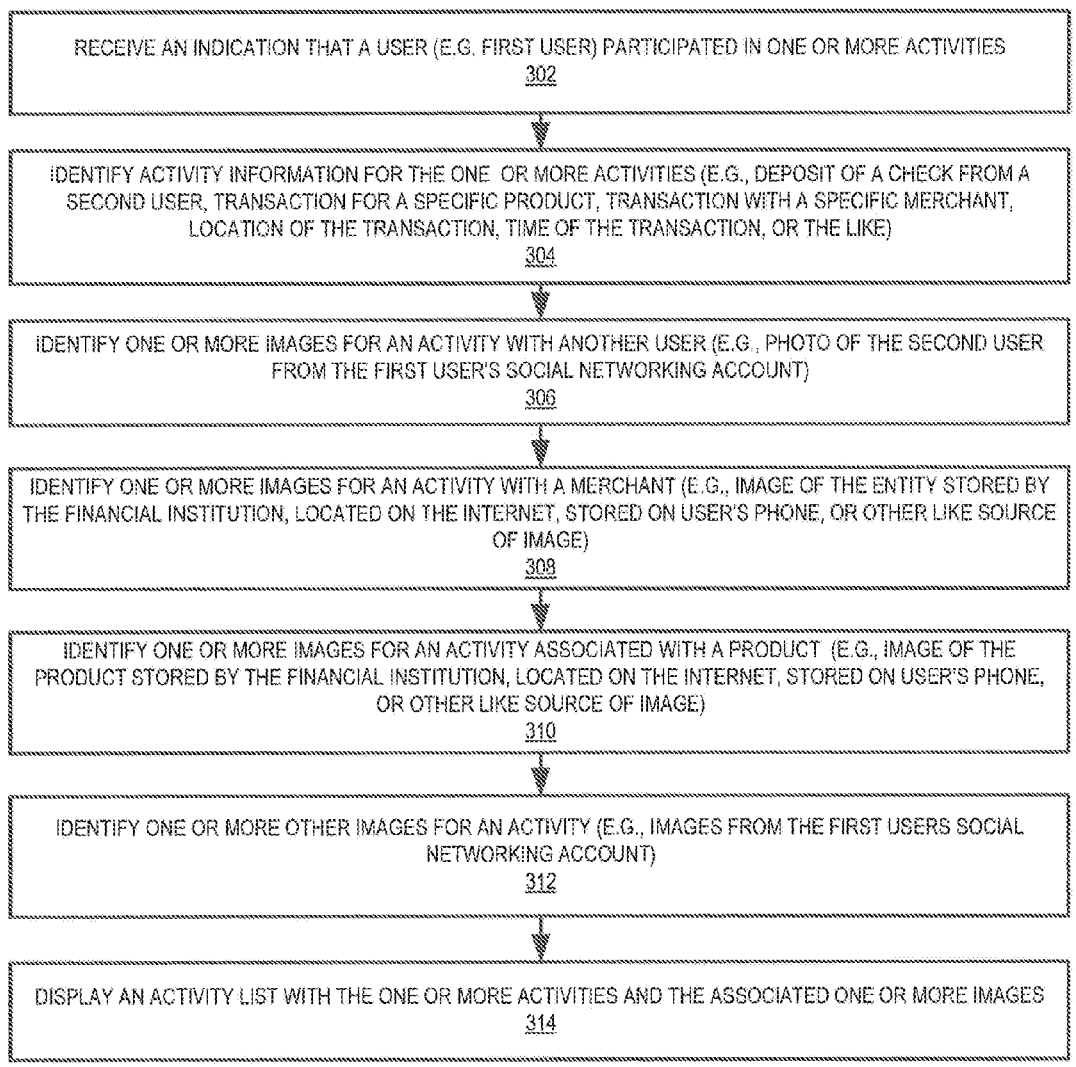

┌─────────────────────────────────────────────────────────────────────┐
│ RECEIVE AN INDICATION THAT A FIRST USER PARTICIPATED IN ONE OR MORE ACTIVITIES │
│ 402 │
└─────────────────────────────────────────────────────────────────────┘
                                    ↓
┌─────────────────────────────────────────────────────────────────────┐
│ ACCESS ACTIVITY INFORMATION FOR THE LOCATION AND TIME PERIOD REGARDING THE ONE OR MORE │
│ ACTIVITIES (E.G., LOCATION AND TIME OF THE ACTIVITY BASED ON SOCIAL NETWORKING, BASED ON A MOBILE │
│ DEVICE, BASED ON TRANSACTION INFORMATION FROM THE MERCHANT, OR THE LIKE) │
│ 404 │
└─────────────────────────────────────────────────────────────────────┘
                                    ↓
┌─────────────────────────────────────────────────────────────────────┐
│ IDENTIFY AND TAG ONE OR MORE USERS (E.G., SECOND USER) ASSOCIATED WITH THE ONE OR MORE │
│ ACTIVITIES (E.G., IDENTIFY TRANSACTIONS MADE BY OTHER USERS AT THE SAME LOCATION WITHIN A TIME │
│ PERIOD AND DETERMINE IF THE ONE OR MORE OTHER USERS IS A CONTACT OF THE FIRST USER) │
│ 406 │
└─────────────────────────────────────────────────────────────────────┘
                                    ↓
┌─────────────────────────────────────────────────────────────────────┐
│ IDENTIFY AND TAG ONE OR MORE LOCATIONS ASSOCIATED WITH THE ONE OR MORE ACTIVITIES (E.G., ACCESS │
│ SOCIAL NETWORKING ACCOUNTS, E-MAIL ACCOUNTS, ENTITY ACCOUNTS, OR THE LIKE AND DETERMINE THE │
│ LOCATIONS ASSOCIATED WITH THE ACTIVITY) │
│ 408 │
└─────────────────────────────────────────────────────────────────────┘
                                    ↓
┌─────────────────────────────────────────────────────────────────────┐
│ IDENTIFY AND TAG ONE OR MORE ENTITIES ASSOCIATED WITH THE ONE OR MORE ACTIVITIES (E.G., IDENTIFY │
│ THE ENTITY WHEN THE ENTITY CHARGES THE FIRST USER ACCOUNT, IDENTIFY THE ENTITY FROM THE │
│ LOCATION INFORMATION, SOCIAL NETWORKING ACCOUNTS, E-MAIL ACCOUNTS, OR OTHER LIKE ACCOUNT, OR │
│ IDENTIFY THE ENTITY FROM A LOCATION DETERMINING DEVICE) │
│ 410 │
└─────────────────────────────────────────────────────────────────────┘
                                    ↓
┌─────────────────────────────────────────────────────────────────────┐
│ IDENTIFY AND TAG ONE OR MORE CATEGORIES ASSOCIATED WITH THE ONE OR MORE ACTIVITIES (E.G., │
│ IDENTIFY ENTITY OR PRODUCT CODES FROM THE TRANSACTION. IDENTIFY A CATEGORY BASED ON THE ENTITY │
│ OR THE PRODUCT FROM THE INTERNET, SOCIAL NETWORKING ACCOUNT, E-RECEIPTS FROM E-MAIL ACCOUNTS, │
│ OR OTHER LIKE ACCOUNT) │
│ 412 │
└─────────────────────────────────────────────────────────────────────┘
                                    ↓
┌─────────────────────────────────────────────────────────────────────┐
│ DISPLAY AN ACTIVITY LIST OF THE ONE OR MORE ACTIVITIES AND ASSOCIATED TAGGED USERS, LOCATIONS, │
│ ENTITIES, OR CATEGORIES │
│ 414 │
└─────────────────────────────────────────────────────────────────────┘
                                    ↓
┌─────────────────────────────────────────────────────────────────────┐
│ RECEIVE AN INDICATION FROM THE FIRST USER TO UPDATE THE ACTIVITY LIST BY ADDING OR REMOVING ONE │
│ OR MORE TAGS FROM ONE OR MORE ACTIVITIES, AND DISPLAY THE UPDATED ACTIVITY LIST TO THE FIRST USER │
│ 416 │
└─────────────────────────────────────────────────────────────────────┘

FIG. 5

- 202 ACTIVITY
- 204 PACKAGES
- 206 ACTIVITY HISTORY
- 208 DEALS

500
- 502 ALL ACCOUNTS
- 504 CALENDAR
- BILL PAY | TRANSFER

TOTAL BALANCE
$ XXX,XXX.XX — 510

JUNE 10, XXXX — 512

| 514 BANK 1 LOGO XXXX | 518 ENTITY 1 LOGO | 516 ENTITY 1 — 520 SHOPPING 10:12 PM CITY 1, STATE 1 — 522 FAN-MODEL-XXXXX | 524 -$30.69 |

| BANK 2 LOGO XXXX | USER 2 | USER 2 INCOME 07:50 PM CITY 1, STATE 1 | $200.00 |

| BANK 1 LOGO XXXX | ENTITY 2 LOGO | ENTITY 2 COFFEE SHOPS 01:10 PM CITY 1, STATE 1 WITH 2 FRIENDS | -$2.85 — 530 |

532 FILTER BY  [USER 1] X   [USER 3] X  — 536   538
534  [CITY, STREET]   [ENTITY]   [COFFEE SHOPS] X

| CONNECT ACCOUNTS | VIEW PACKAGE | EDIT PHOTO | EDIT TAGS |

| BANK 1 LOGO XXXX | ENTITY 3 LOGO | ENTITY 3 FAST FOOD 11:50 AM CITY 1, STATE 1 | -$5.09 |

JUNE 9, XXXX

| BANK 1 LOGO XXXX — 570 | ENTITY 1 LOGO | SHOPPING 07:12 PM CITY 1, STATE 1 | -$172.62 |
| | | LCD TV-XXXXX | ENTITY 5-$164.30 |
| | | HDMI CABLE-XXXXX | ENTITY 6-$8.32 |

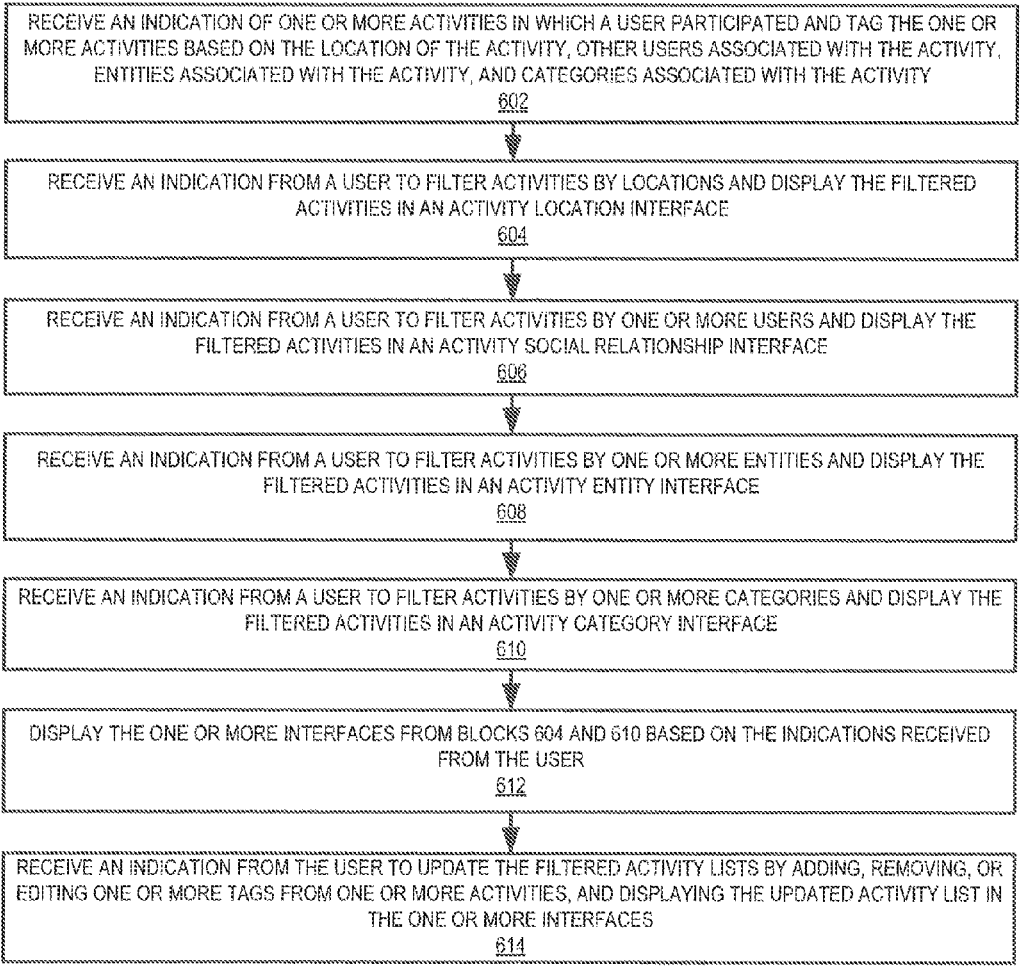

ACTIVITY REVIEW FOR A FINANCIAL AND SOCIAL MANAGEMENT SYSTEM

CROSS-REFERENCE TO RELATED APPLICATIONS

The present application is a continuation application of U.S. non-provisional patent application Ser. No. 14/032,653, filed Sep. 20, 2013 of the same title; the content of which is also incorporated herein by reference in its entirety.

FIELD

The present invention relates to the field of financial management tools and social networking management tools.

BACKGROUND

Financial management systems allow for tracking transactions, while social networking systems allow users to interact with other users. However, financial systems do not provide the ability to track and group transactions based on social networking interactions, while social networking systems do not provide the ability to relate the social networking interactions to transactions.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the invention comprise systems, computer program products, and methods for a financial and social management system that provides improved tracking and management related to how, where, when, and with whom a user enters into activities. The financial and social management system captures activity information and images from various sources of information, including but not limited to social networking accounts, e-receipts, location determination devices, and the like, and associates the activity information and images with the activities. The financial and social management system aggregates the activity information for a number of activities based on the location, user, entity, category, cost, time period, or the like and displays the aggregated activity information in an activity review interface. The financial and social management system may supplement the aggregated activity information with educational data.

One embodiment of the invention comprises receiving an indication to identify and aggregate activity information for one or more activities over a time period; identifying the one or more activities that meet the time period; aggregating the activity information for the one or more activities, wherein aggregating the activity information comprises aggregating the activity information related to locations involved in the one or more activities; aggregating the activity information related to social relationships involved in the one or more activities; aggregating the activity information related to entities involved in the one or more activities; and aggregating the activity information related to categories involved in the one or more activities; and displaying the aggregated activity information for the one or more activities related to the locations, the social relationships, the entities, and the categories in an interface.

In further accord with an embodiment, the invention further comprises supplementing the aggregated activity information with educational information related to the one or more activities. In another embodiment of the invention, the educational information is consumption information related to the one or more activities.

In yet another embodiment, the invention further comprises accessing a social networking account of the first user; determining one or more images associated with the aggregated activity information for the one or more activities; and displaying the one or more images with the aggregated activity information.

In still another embodiment of the invention, aggregating the activity information comprises aggregating the activity information for the one or more activities for the locations, the social relationships, the entities, and the categories.

In further accord with an embodiment of the invention, aggregating the activity information for the one or more activities comprises aggregating the activity based on a time day of the one or more activities.

In another embodiment of the invention, identifying and aggregating the activity information for the one or more activities over the past time period comprises receiving an indication from the first user identifying the locations, the social relationships, the entities, and the categories to aggregate; and receiving the time period from the first user over which to aggregate the activity information.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
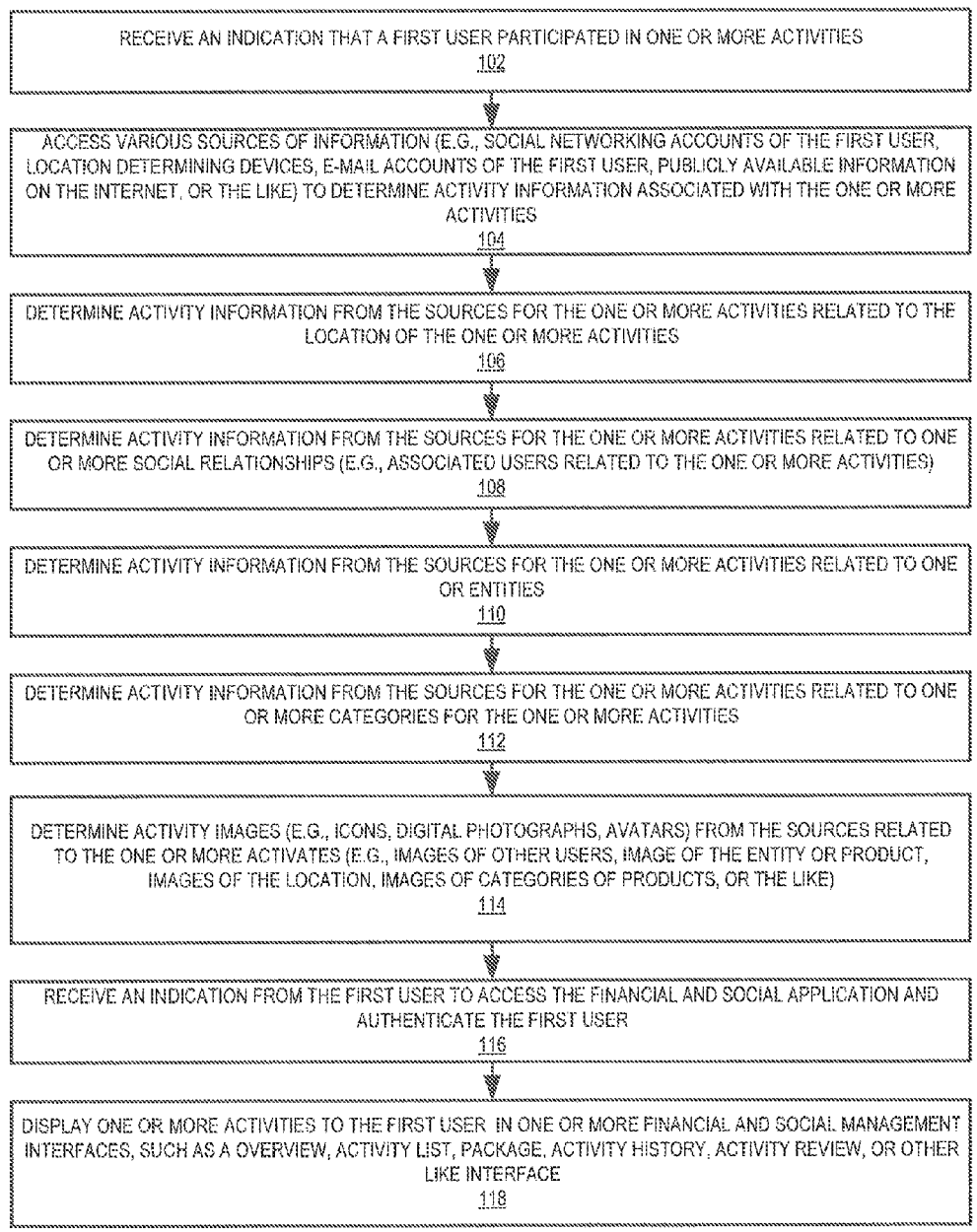
Figure 2:
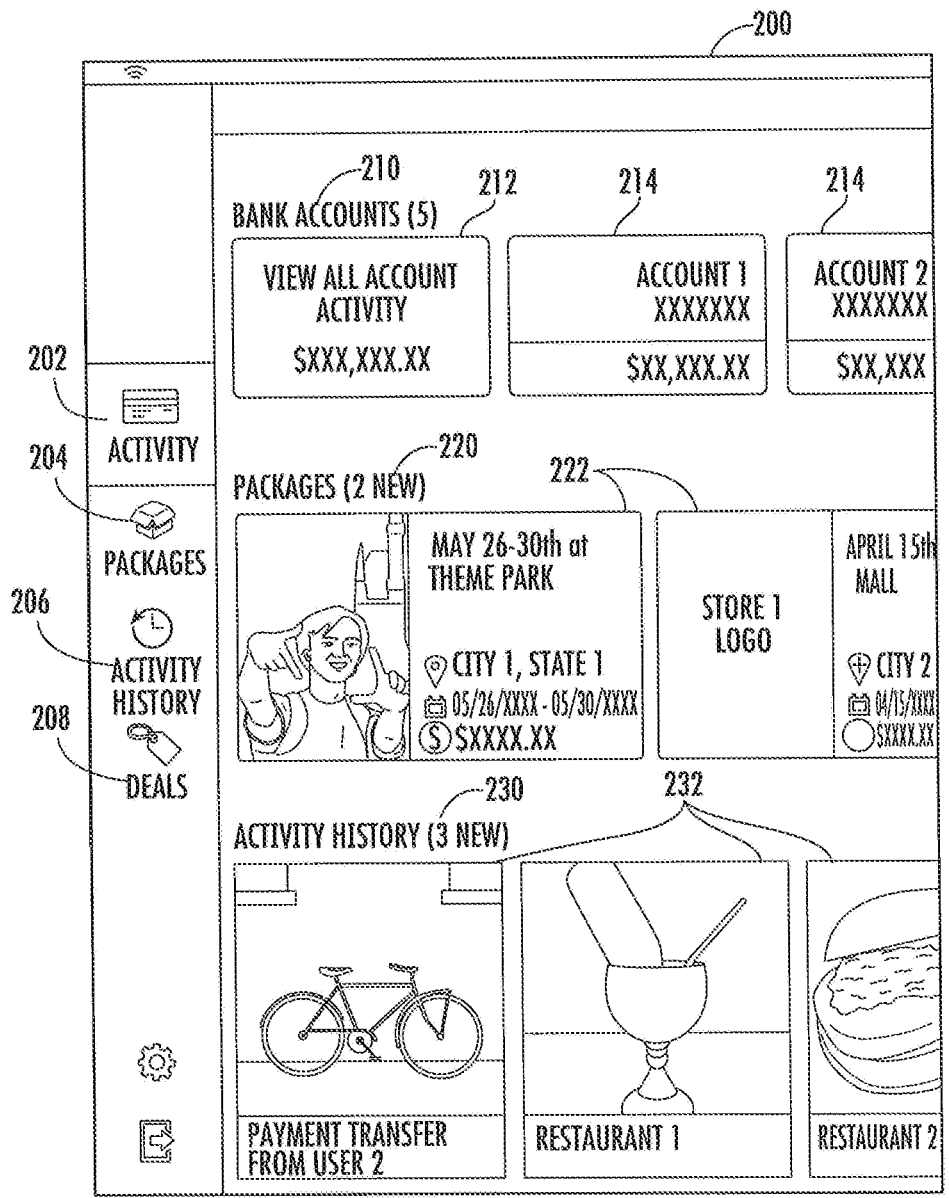
Figure 7:
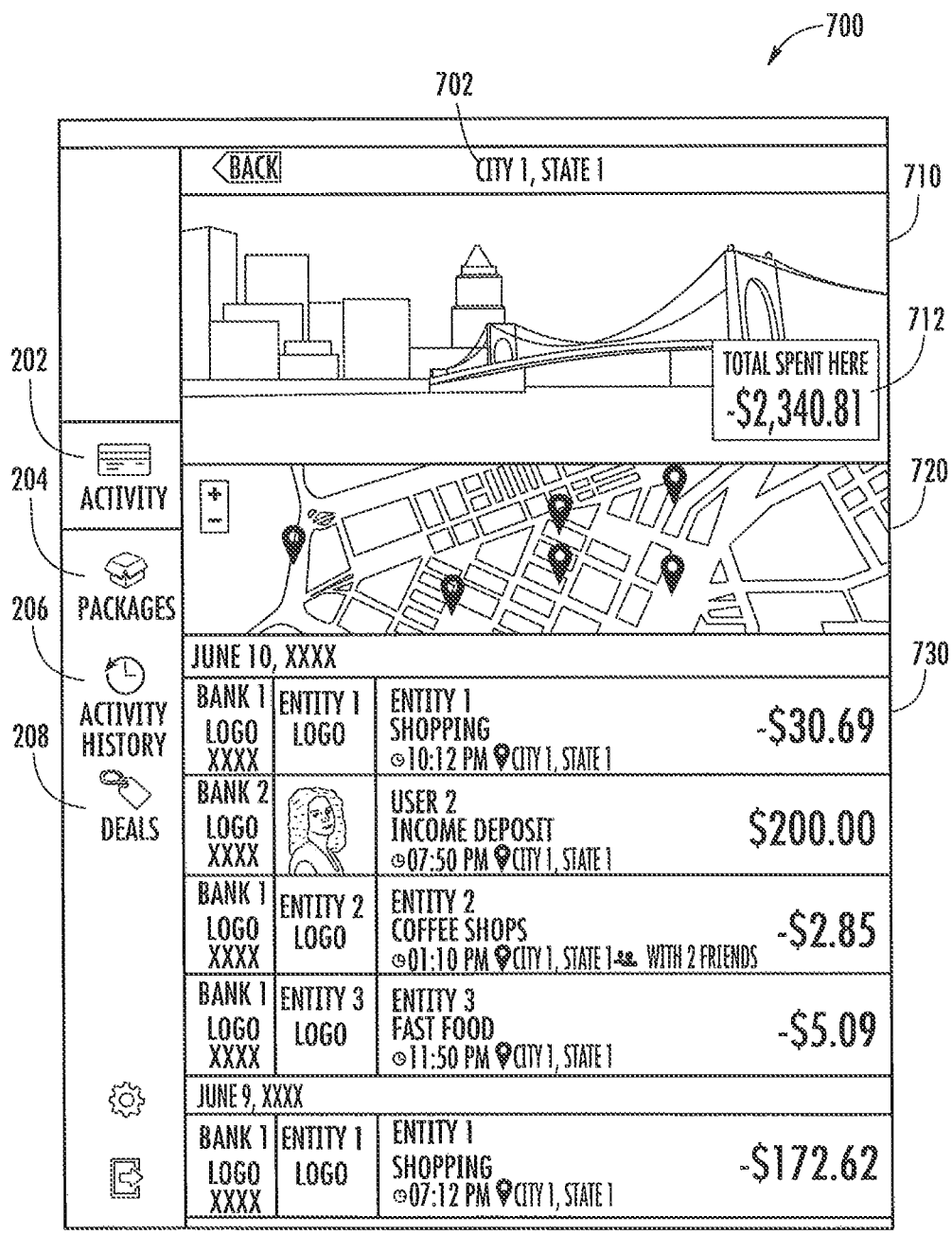
Figure 8:
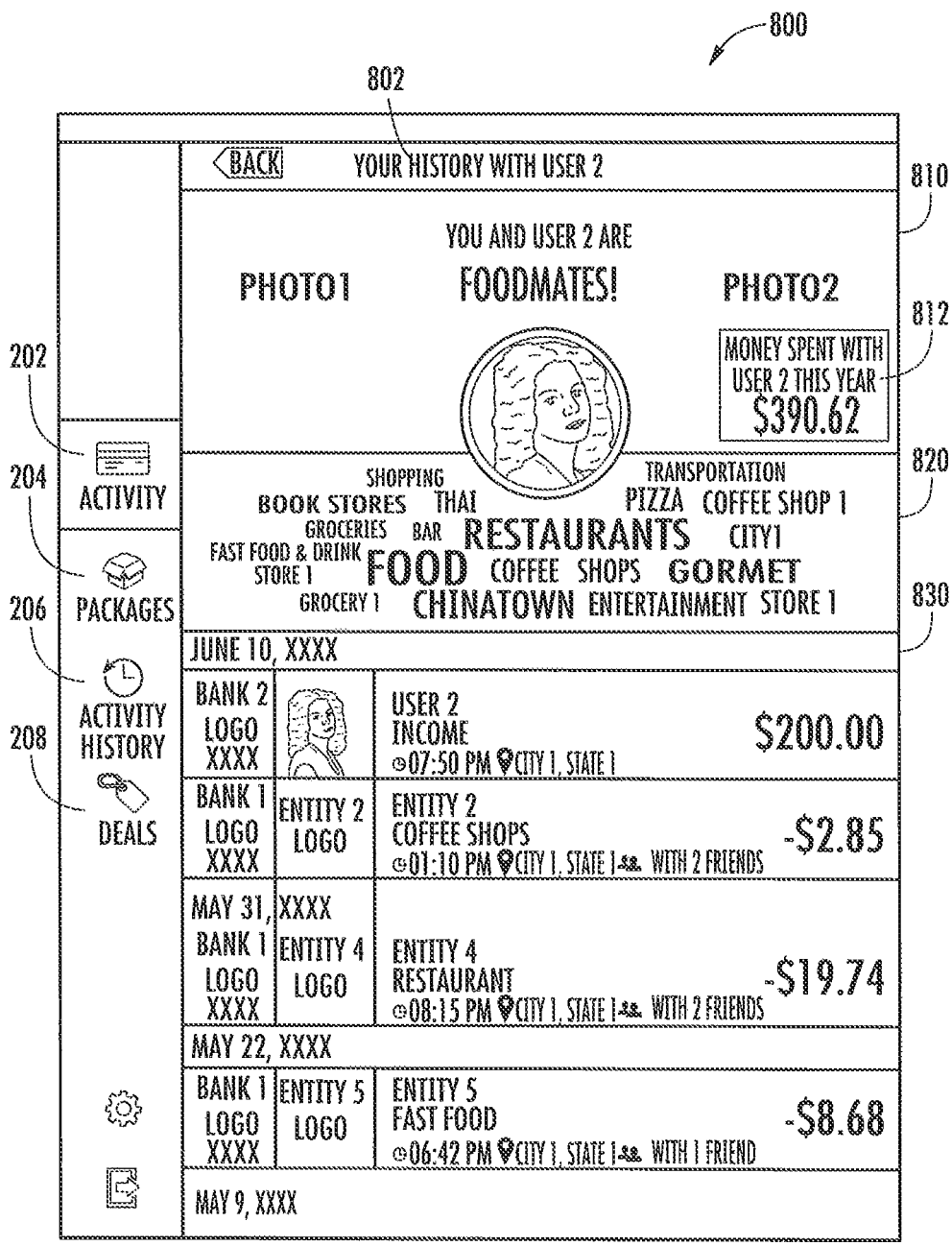
Figure 9:
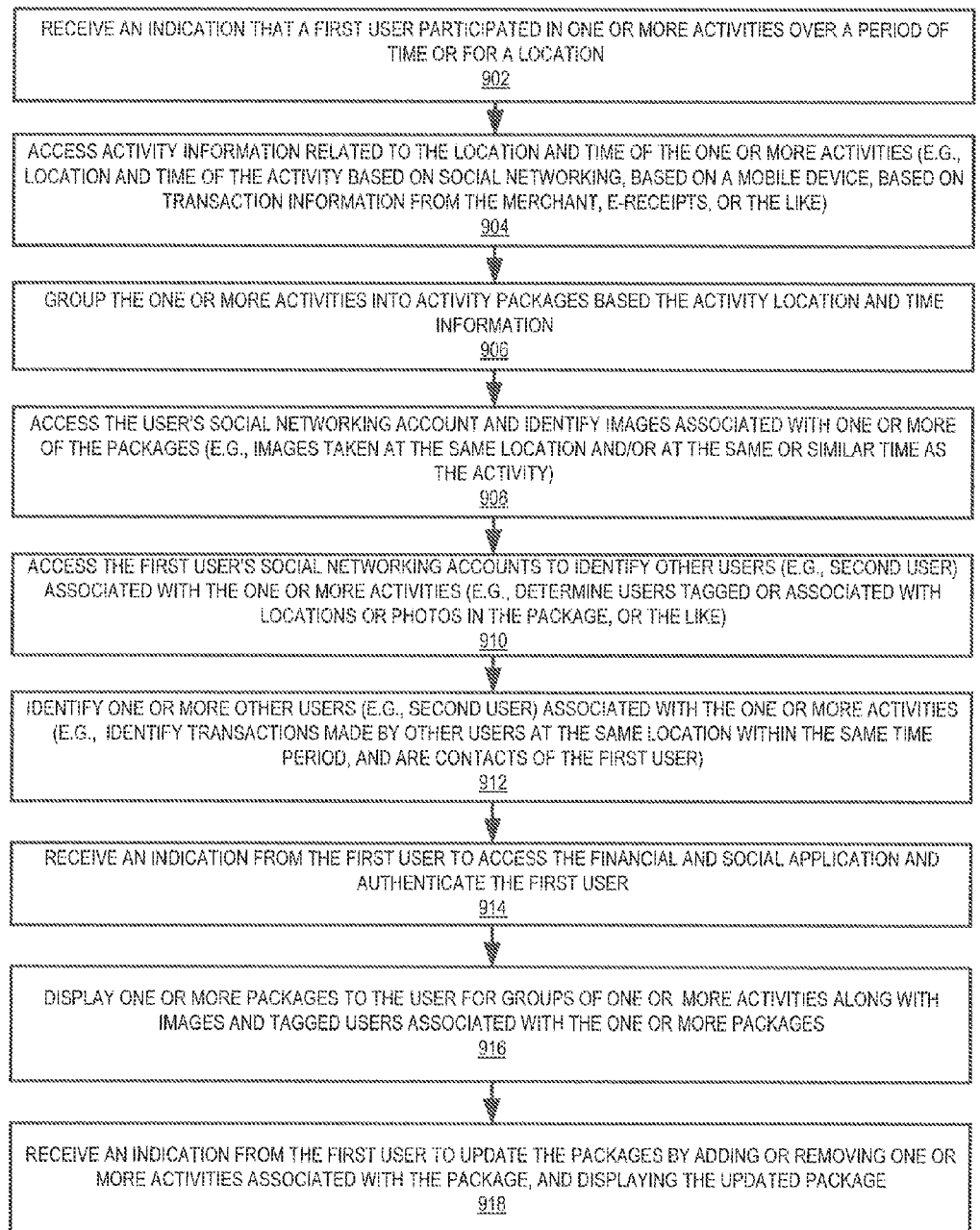
Figure 10:
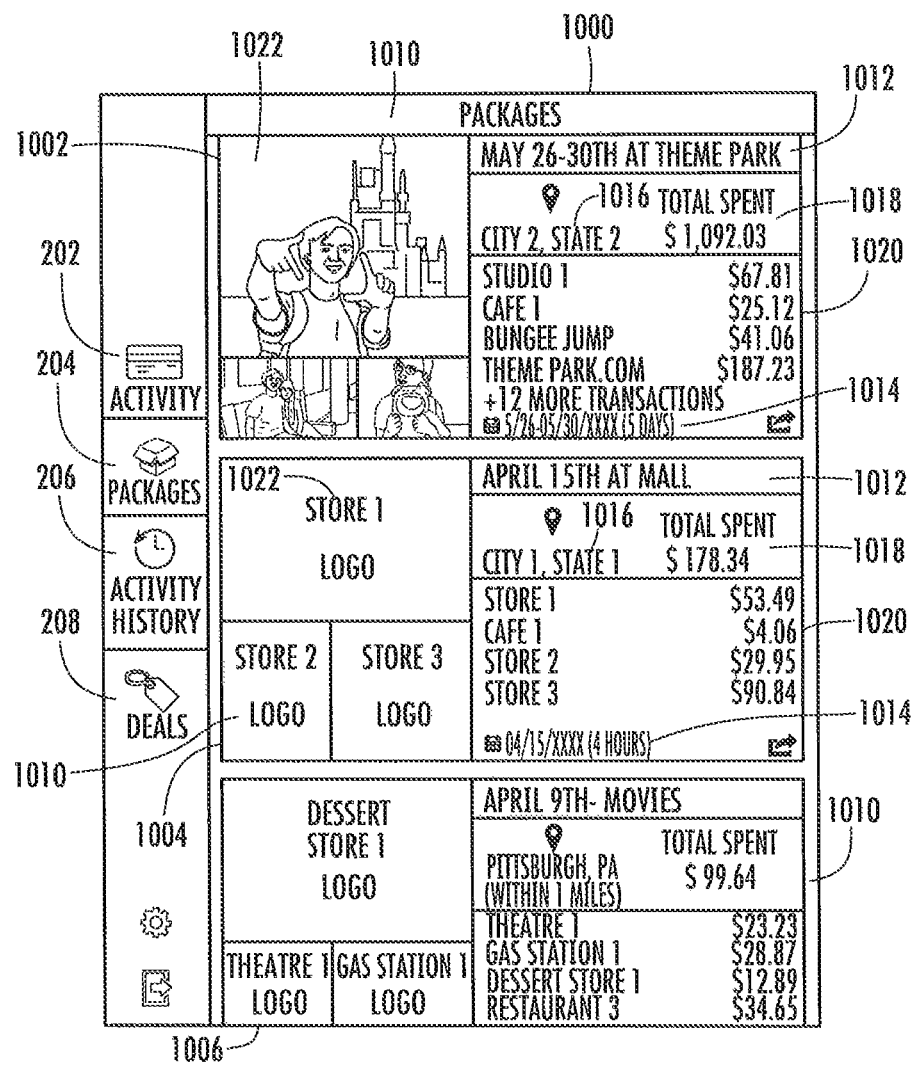
Figure 11:
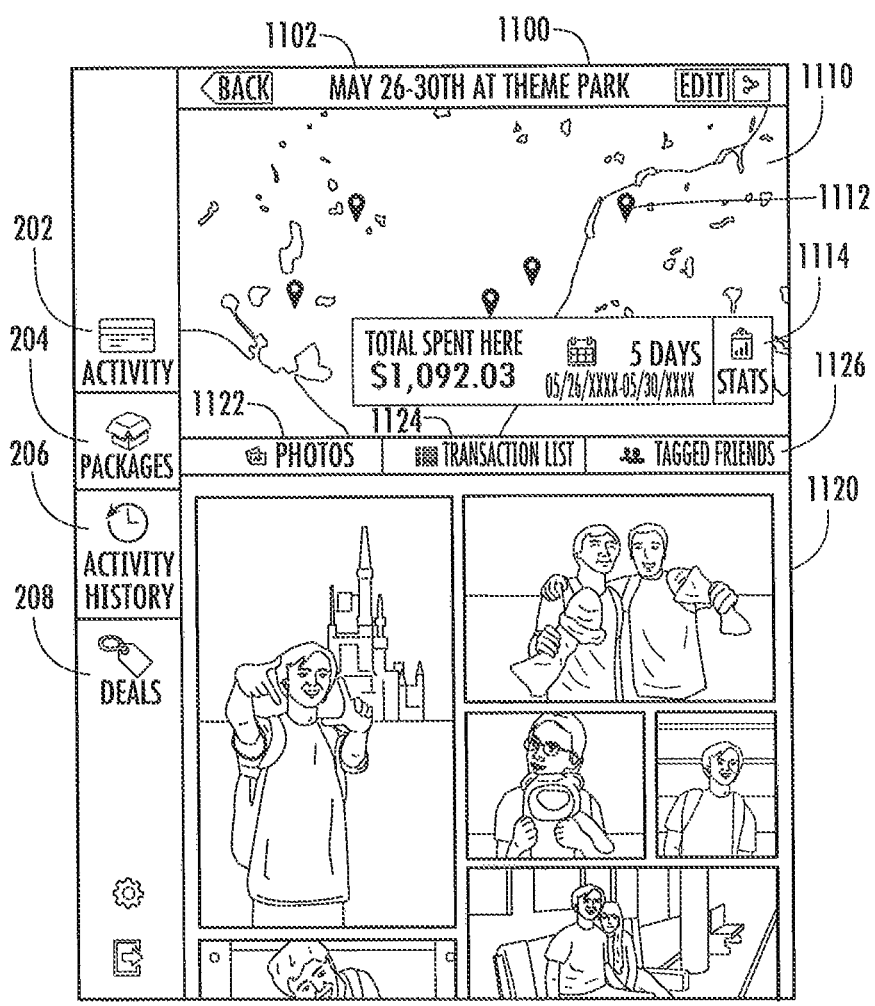
Figure 12:
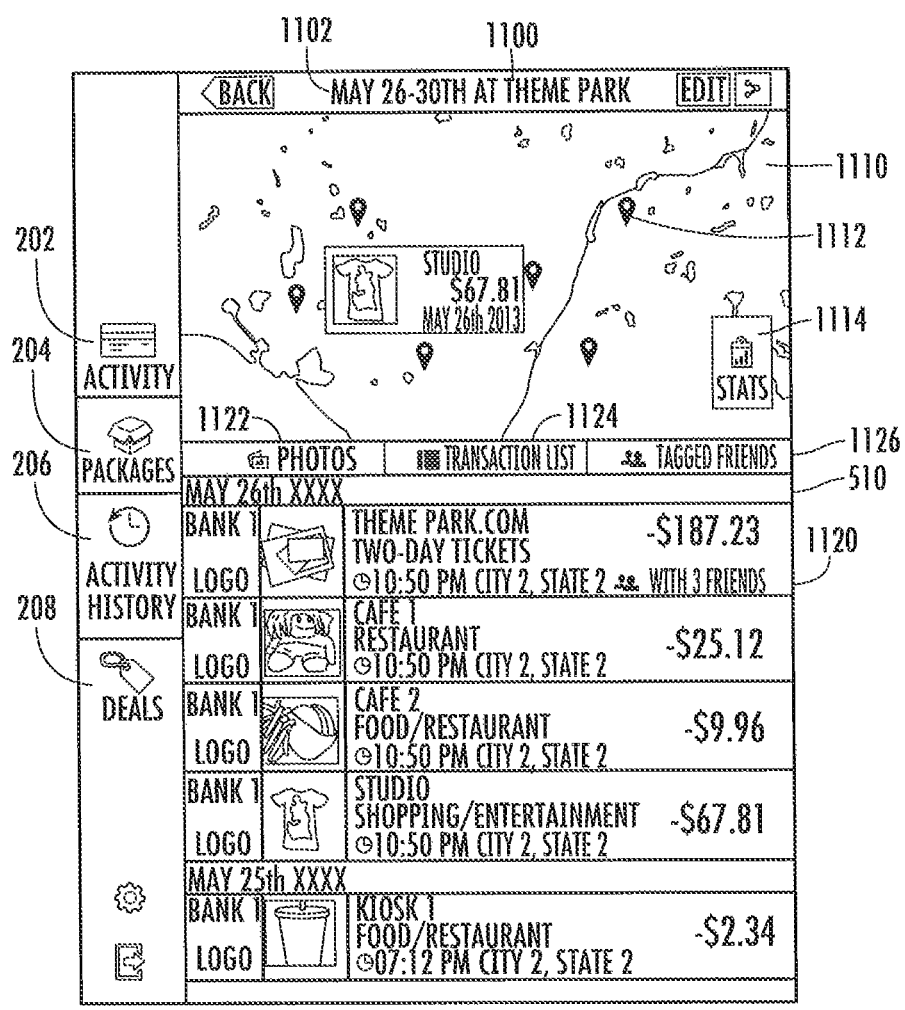
Figure 13:
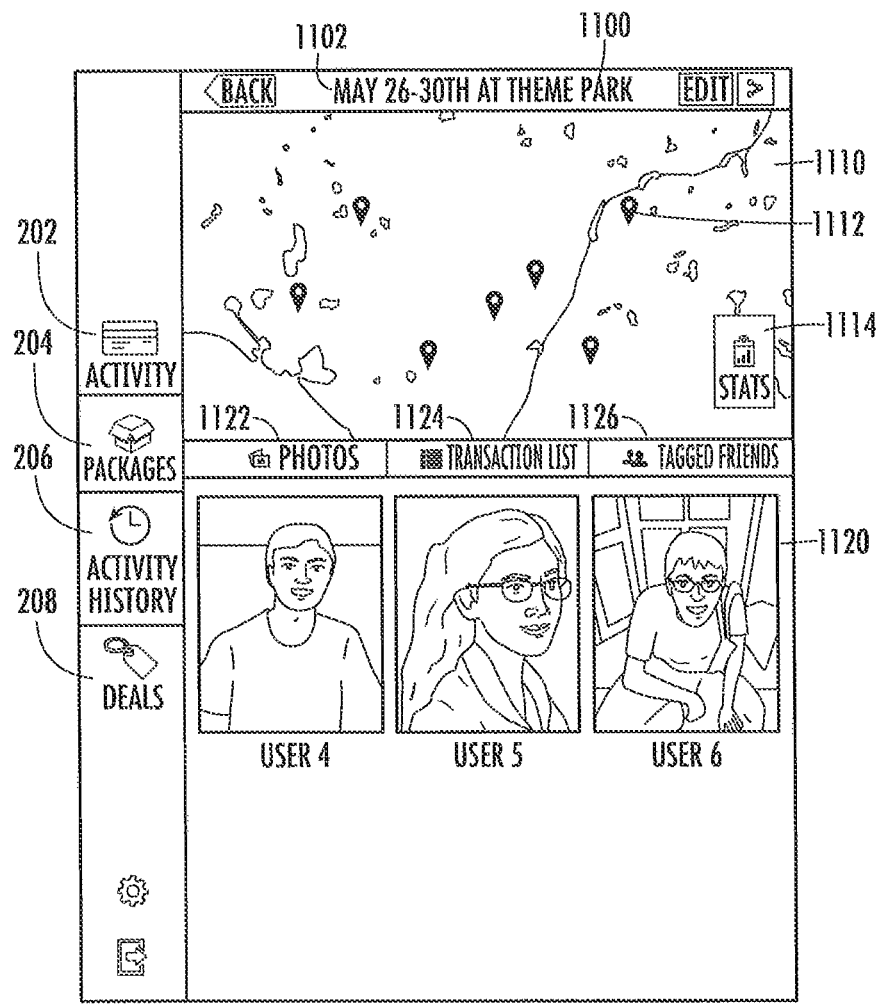
Figure 14:
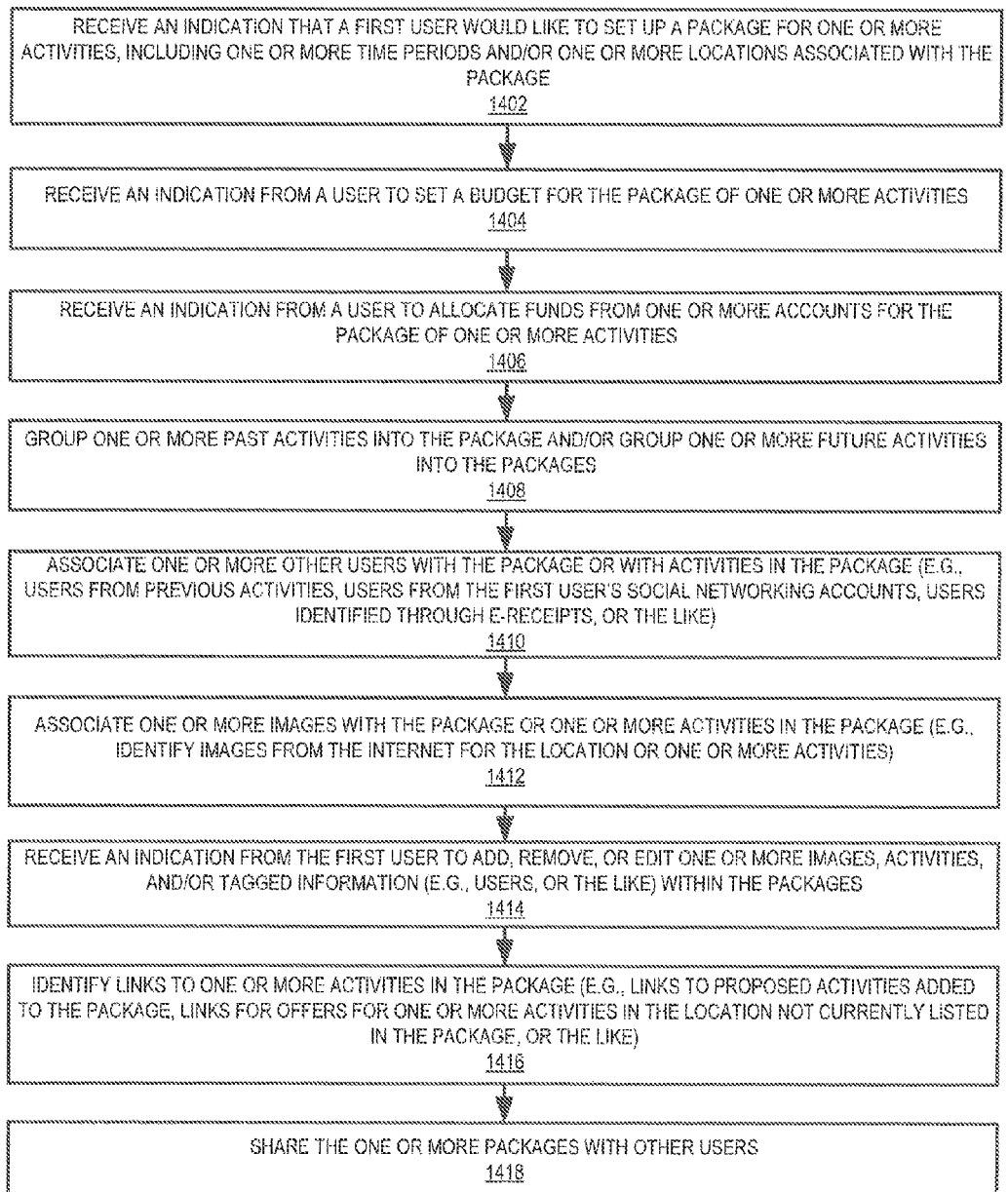
Figure 15:
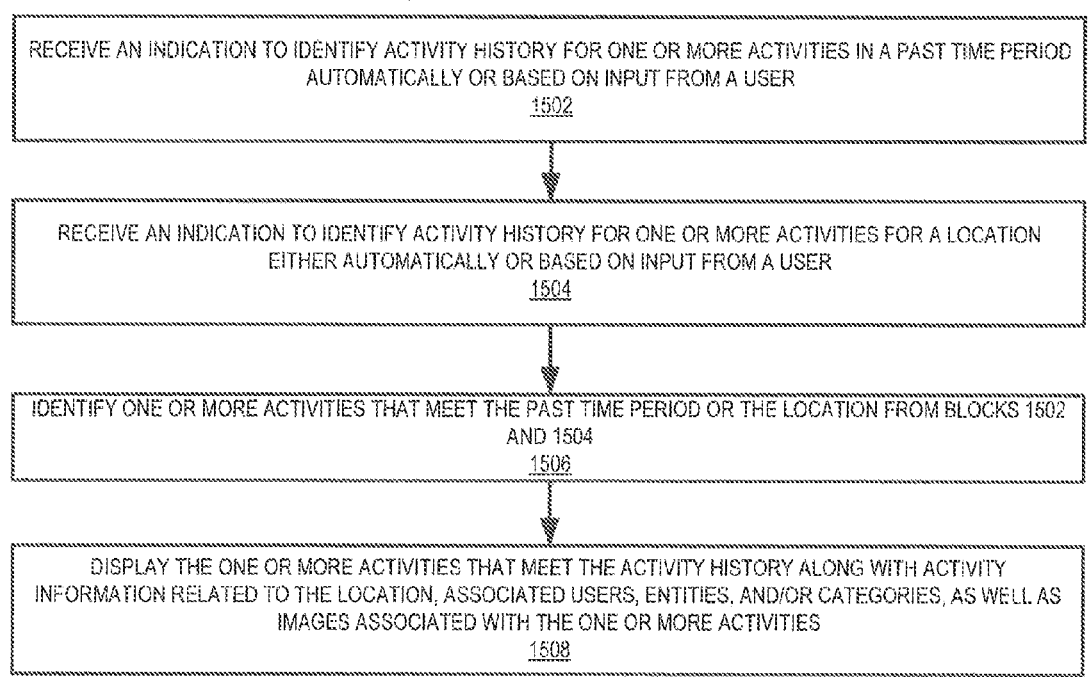
Figure 16:
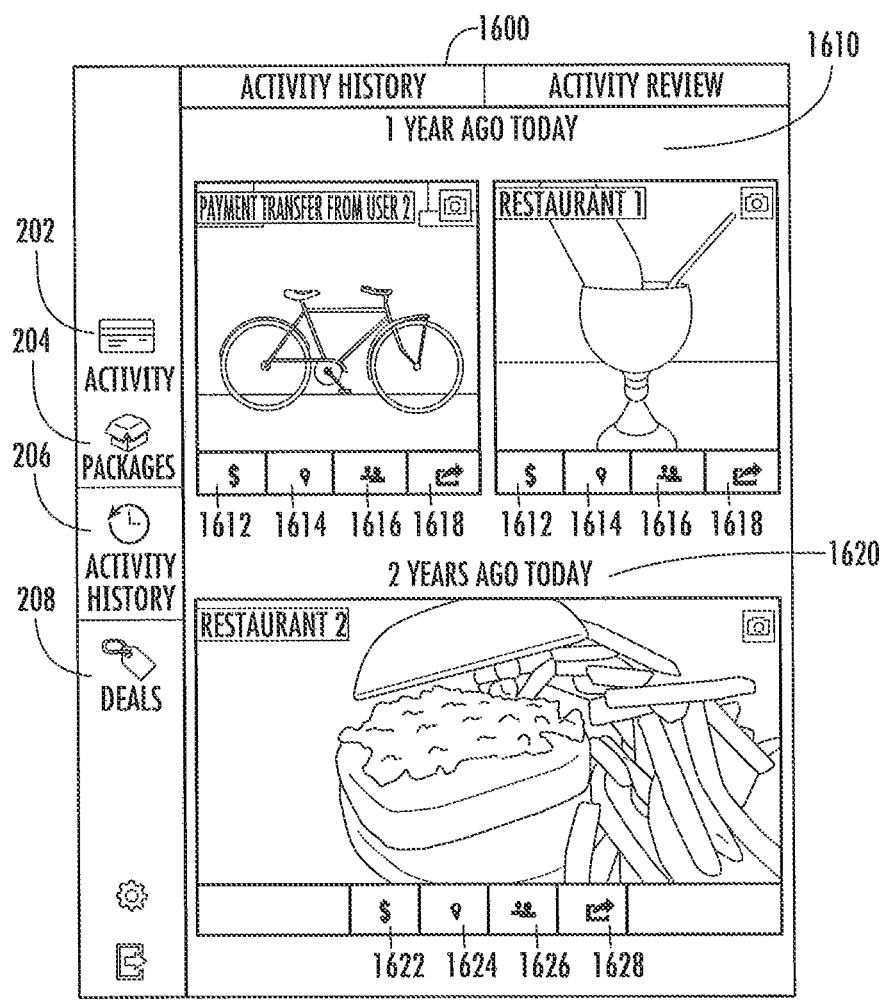
Figure 17:
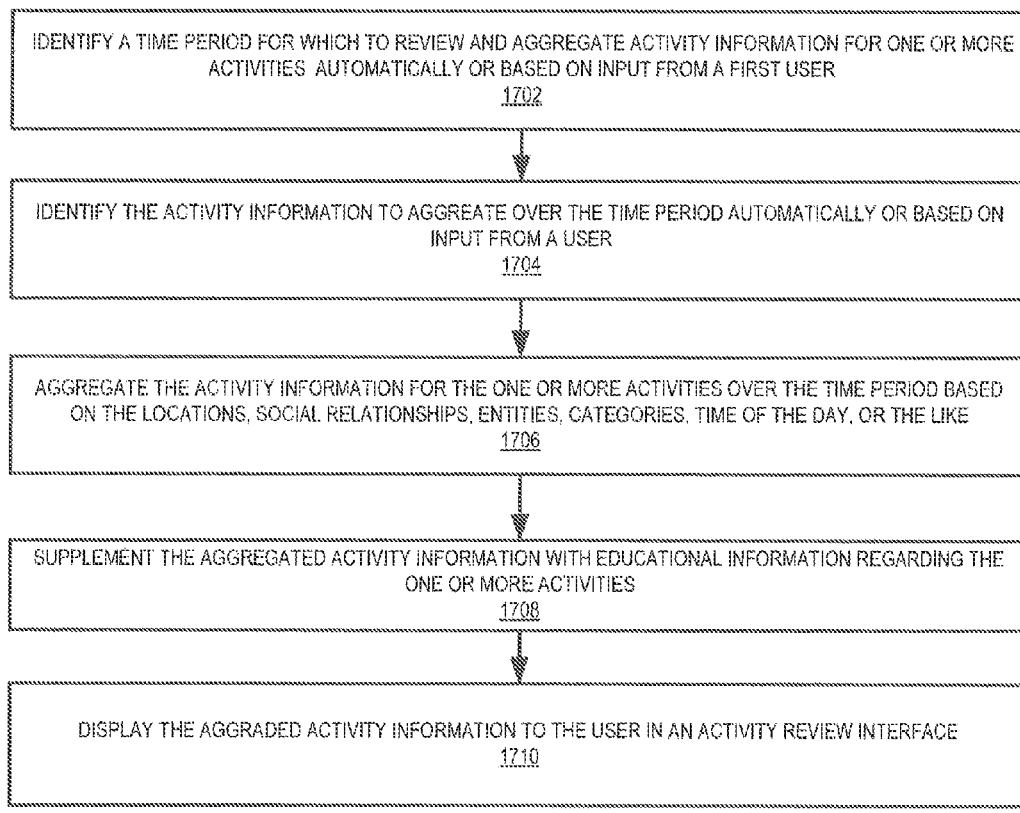
Figure 18:
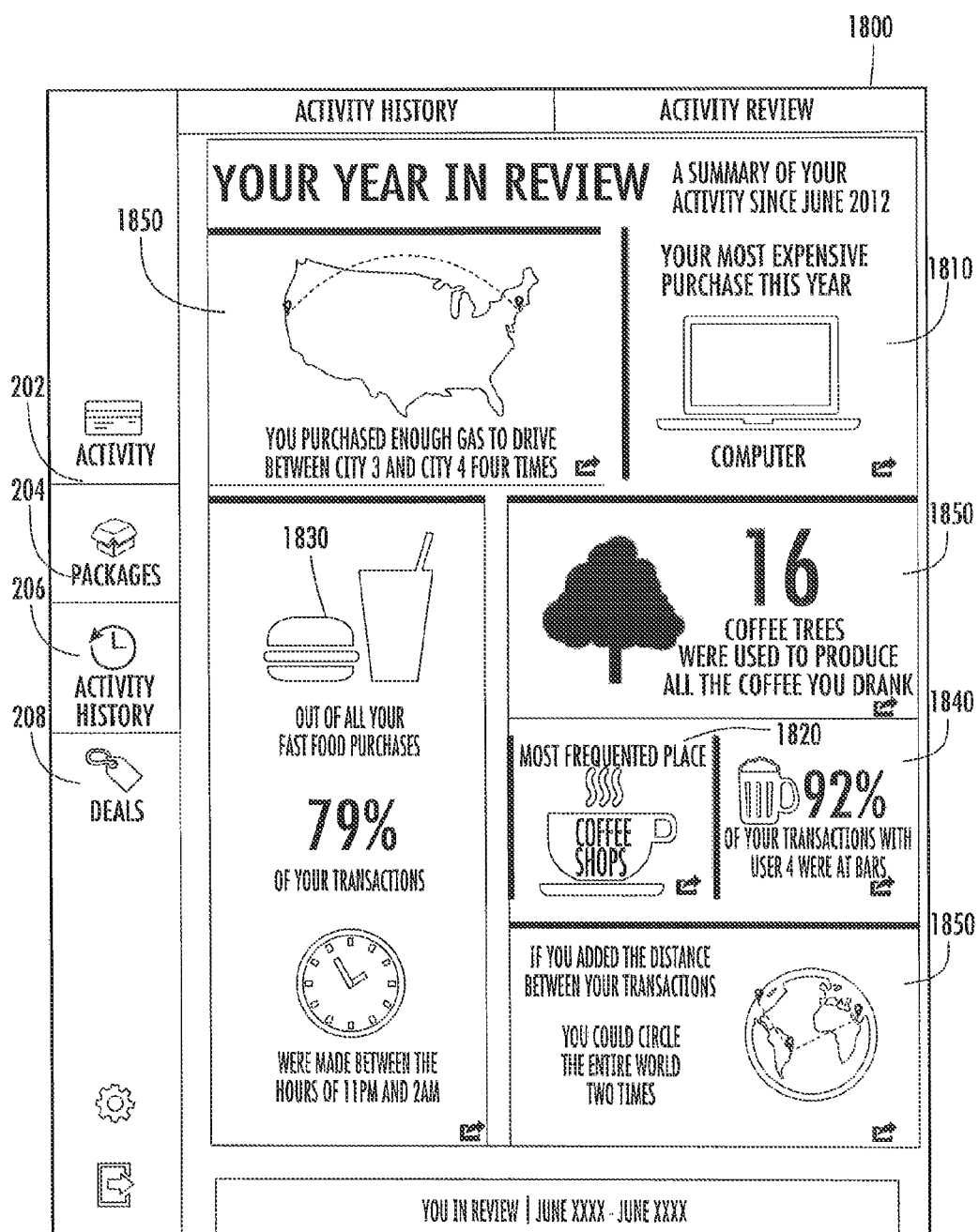
Figure 19:
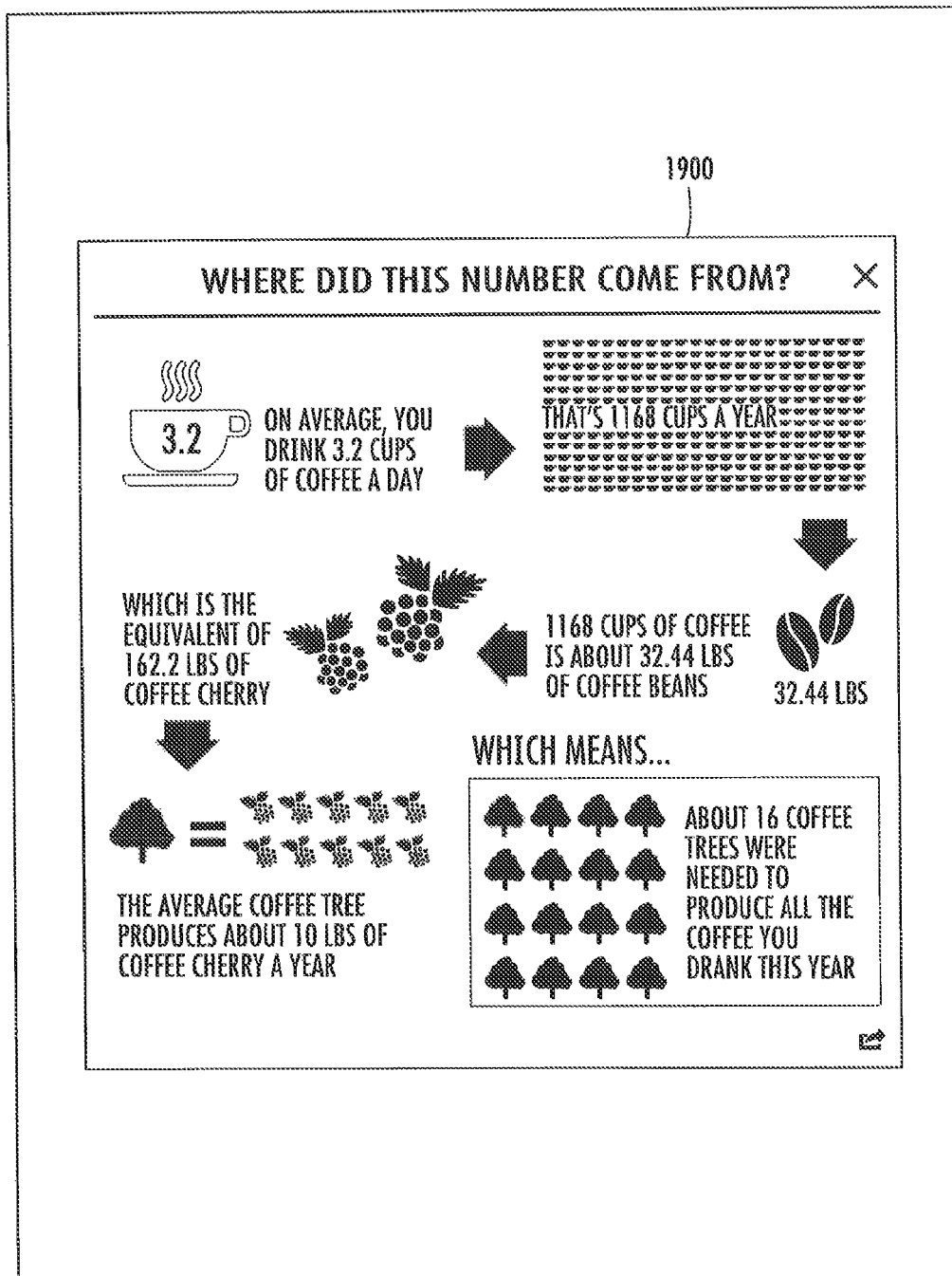
Figure 20:
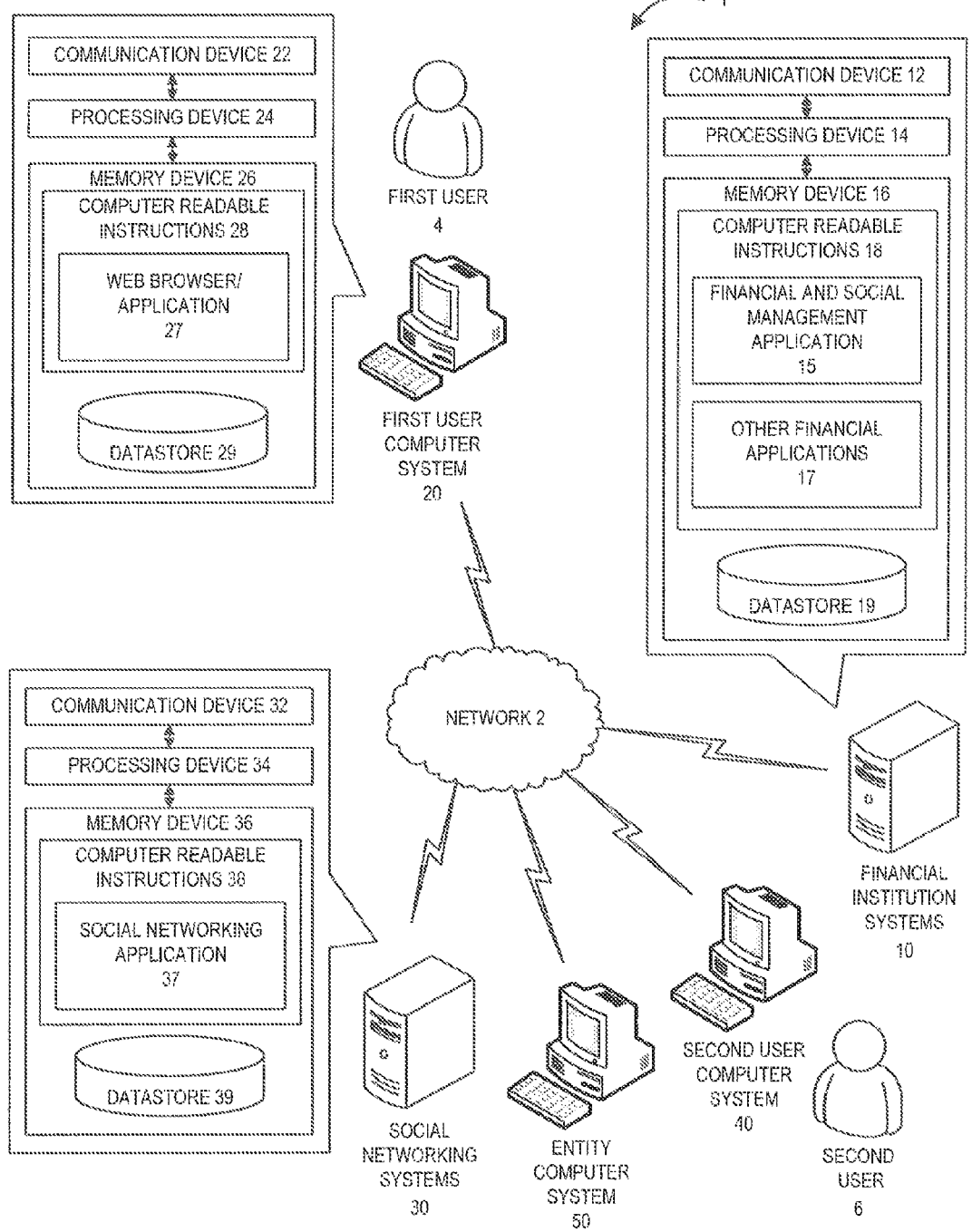

Having thus described embodiments of the invention in general terms, reference will now be made to the accompanying drawings, which are not necessarily drawn to scale, and wherein:

FIG. 1 illustrates a financial and social management process flow, in accordance with one embodiment of the invention;

FIG. 2 illustrates a financial and social management overview interface, in accordance with an embodiment of the invention;

FIG. 3 illustrates an image integration process flow, in accordance with one embodiment of the invention;

FIG. 4 illustrates a tagged relationship process flow, in accordance with one embodiment of the invention;

FIG. 5 illustrates an activity list interface, in accordance with an embodiment of the invention;

FIG. 6 illustrates an activity filter process flow, in accordance with an embodiment of the invention;

FIG. 7 illustrates an activity location interface, in accordance with an embodiment of the invention;

FIG. 8 illustrates an activity social relationship interface, in accordance with an embodiment of the invention;

FIG. 9 illustrates a past package process flow, in accordance with an embodiment of the invention;

FIG. 10 illustrates a package overview interface, in accordance with an embodiment of the invention;

FIG. 11 illustrates a package image interface, in accordance with an embodiment of the invention;

FIG. 12 illustrates a package transaction interface, in accordance with an embodiment of the invention;

FIG. 13 illustrates a package social relationship interface, in accordance with an embodiment of the invention;

FIG. 14 illustrates a proposed package process flow, in accordance with an embodiment of the invention;

FIG. 15 illustrates an activity history process flow, in accordance with an embodiment of the invention;

FIG. 16 illustrates an activity history interface, in accordance with an embodiment of the invention;

FIG. 17 illustrates an activity review process flow, in accordance with an embodiment of the invention;

FIG. 18 illustrates an activity review overview interface, in accordance with an embodiment of the invention;

FIG. 19 illustrates an activity review interface, in accordance with an embodiment of the invention; and FIG. 20 illustrates a financial and social management system, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Generally, systems, computer program products, and methods are described herein for a financial and social management system that provides improved tracking and management related to how, where, when, and with whom a user (e.g., a customer) enters into activities (e.g., transactions for goods or services described herein as "products", or transfers of currency) with entities (e.g., merchants, other users, or other like entities). As described herein the term activity information associated with the activity is used to not only describe the transaction (e.g., cost of the transaction, time of the transaction, or other transaction information) in which the user enters, but also other information related to the transaction, such as location, social relationship, entity, and category information. The financial and social management system 1 may display the activity and activity information in activity list interfaces, packaged activity interfaces, filtered activity interfaces, activity history interfaces, activity review interfaces, or other like interfaces that incorporate aspects of financial transactions and social networking information.

The financial and social management system 1 provides the activity and activity information in activity lists within activity list interfaces. The activity lists may include the activities (e.g., transactions) in which the user (e.g., customer) has entered, and associated images (e.g., photos, videos, icons, symbols, card art, check art, other art, or other like images), or any other type of digital content related to the activities or the environment related to the activities. The activity list may also include tagged information, such as but not limited to location tags indicating the location the activity, social relationship tags (e.g., user tags) indicating other users associated with the activity, entity tags indicating the entity (e.g., merchant, non-profit organization, historic site, national park, or the like entity) associated with the activity, or category tags (e.g., product categories such as goods, good categories, services, service categories, or the like) indicating groupings for the activities in the activity lists. The activity information and images in the activity lists may come from various sources including social networking accounts of the users, e-mail accounts of the users (e.g., e-mail correspondence, e-receipts, or the like), user calendars, user contact lists, websites over the Internet (e.g., websites of the entities or for the products), or other like accounts that provide additional activity information related to the activities in the activity list.

The activity list in the financial and social management system 1 may also include filters that allow a user to access specific views of a plurality of activities based on the activity information related to locations, social relationships, entities, and categories, and view the activities in filtered interfaces. The filters may provide interfaces with interactive maps of the location of multiple transactions, social relationships between the user and other users present during the transactions (e.g., users of the financial management systems, users of the social networking systems, other users referenced in these systems, or the like), transactions entered into with particular entities, transactions entered into based on particular categories, or other filtered activity information.

In addition to the activity lists the financial and social management system 1 provides packages (e.g., past packages, proposed packages, group packages) that consolidate activities into groups based on time period, location, categories, or the like. The past packages allow a user to consolidate activities together for a particular time period (e.g., date, date range, or the like) or location for capturing spending, budgeting, reimbursement, or other like information. The past packages may be utilized for trips or otherwise for grouping activities together. The proposed packages may consolidate activities that have occurred, are pending, or may occur in the future in order to save and budget for events, such as trips, purchases (e.g., renovating a room), or other like activities. The group packages may be proposed or past packages that can be shared between users in order to split purchases related to activities, or otherwise budget and plan for trips or purchases in the future with a group of two or more users.

The financial and social management system 1 also provides activity history interfaces for providing financial information related to activities that have occurred in the past along with social networking information or other activity information related to the activities. The financial and social management system 1 automatically, or manually based on a customer request, provides activity, activity information, and images for past activities. For example, a user may receive an update every day for activities that the user had exactly a year ago from the current day. In other examples, the user may be in a town which the user previously visited and the user may request to see all of the transactions that the user made in the town in the past in order to identify a particular restaurant, store, product, or the like. In response, the activity history interface may provide all of the activities that the user had for the particular location in the past.

The system also provides activity review interfaces that display data related to the activities the user participated in over a specified time period in order to provide spending and budgeting information regarding how, where, when, and with whom the user entered past transactions. For example, the activity review interface may illustrate statistics such as, most expensive purchase, fast food purchases vs. upscale restaurant purchases, locational spending across areas within a city, state, region, or the like, spending habits with particular friends, or the like. The system may also provide customized facts related to spending, such as consumption facts based on user spending (e.g., amount of coffee beans used based on the amount of coffee the customer drank, or the like).

FIG. 1 illustrates a financial and social management process flow 100 for the financial and social management system 1. As illustrated by block 102 in FIG. 1 the financial and social management system 1 receives an indication that a first user 4 has participated in one or more activities. The activities may include transactions for products with an entity, transfers of funds from other financial institutions, deposits of funds from other users (e.g. within or outside of the financial institution), transactions with other users, or other like activities. For example, the financial and social management system 1 may receive an indication that a first user 4 has entered into a transaction with an entity. As described herein throughout this specification "receiving an indication" may include among other things, receiving an indication from a system or application internally or externally, either automatically (e.g., when the user enters into a transaction, receives a transaction from another entity, enters a location, a time period is met, or the like) or manually, when the user takes a specific action (e.g., requests to view particular information, or the like).

As illustrated by block 104 the financial and social management system 1 accesses various sources of information in order to determine activity information associated with the one or more activities. The one or more sources of information may include the traditional source of information that is transferred to an institution (e.g., financial institution) by an entity as a result of a transaction between the entity and a user (e.g., customer). For example, if a first user 4 enters into a transaction with an entity (e.g., a merchant) the entity provides transaction information to the institution (e.g., financial institution, or third party institution) that controls the account from which the first user 4 is making the transaction. The activity information from the entity may include for example, the price of the transaction, the name of the entity, and the time of the transaction. However, in many instances the transaction information does not include the location of the transaction, a breakdown of the goods or services (e.g., products) and associated individual costs, categories for the types of products purchased, or the like. In some embodiments, the transaction information may not include the time of the transaction. Furthermore, even if the location is provided in the transaction information, it may not be the actual location at which the purchase was made or the location at which the activity will occur. For example, the first user 4 may order a product over the internet, and the product location may be location of the business not the location from which the first user 4 placed the order. Moreover, in another example the first user 4 may purchase tickets for a show in another city, the location information transferred may be the city in which the user made the transaction not the location of the ultimate transaction, such as the location of the show. In some embodiments the entity and/or the institution does not have the ability to transfer or receive information other than the total cost of the transaction and the name of the entity. Furthermore, the name of the entity may be a holding company or other name that does not reflect the true entity with which the user entered into a transaction. Therefore, the various other sources of information accessed may provide additional activity information related to the activity (e.g., transaction).

The users (e.g., first user 4, second user 6, or the like) may allow the institution to access other types of activity information from various sources of information to supplement the activity information the entity may receive during a transaction with an entity. For example, in some embodiments the user may allow the institution (e.g., financial institution, third-party institution) within the financial and social management system 1 to access the user's social networking accounts to receive additional activity information related to one or more activities (e.g., transactions). For example, the institution may be able to access photos, determine other users with which the user has social relationships through connections (e.g., friends, family, co-workers, or the like), determine locations (e.g., tagged locations, locations of photos taken or uploaded, or the like) and times at which the user was located during an activity, or the like. The social networking accounts include, but are not limited to, any medium through which users or entities share content, such as but not limited, texts, images (including videos), audio, files, links, feeds, streaming content, or any other type of digital content, or any other type of personal or professional information related to the users or entities.

In another example, the users may allow an institution to track the user's locations through a location determining device (e.g., GPS, or other like device) in a user's mobile device when entering a transaction, and thus, identify the location of users when entering the transaction. In other embodiments of the invention, the location determining device may be a Wi-Fi triangulation, or the like that can be used to determine the location of the user when the user is utilizing a Wi-Fi connection though a mobile device. For example, the user's mobile device may have a specific address when utilizing a Wi-Fi connection and the location of the user may be determined by identifying the address of the mobile device and the Wi-Fi network on which the user device is operating, such as on a Wi-Fi hot spot at an entry, or other like location.

In other embodiments of the invention electronic data captured from electronic receipts or actual receipts may be used as a source of activity information. In the online purchase context, various electronic communications may be provided to the customer from the merchant relative to a purchase. For example, following an online purchase, the merchant may provide the customer an electronic order confirmation communication. The order confirmation may be sent to the customer's computer and displayed in a web browser application. The web browser application typically allows the customer to print a hard copy of the order confirmation and to save the confirmation electronically. The merchant will also typically send an email containing the order confirmation to the customer's designated email account. The order confirmation is essentially an e-receipt for the online purchase. The order confirmation includes detailed information regarding the products or services purchased. For example, in the case of a product, the order confirmation may include stock keeping unit "SKU" code level data, as well as other parameters, such as order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like. The order confirmation also includes information about the merchant, such as name, address, phone number, web address, and the like. For most online transactions, the merchant will send at least one second communication confirming shipment of the order. The order shipment confirmation is typically also sent via email to the customer and typically includes the same information as the order confirmation, and in addition, shipping date, tracking number, and other relevant information regarding the order and shipment parameters.

Many merchants now also provide e-receipts to customers shopping at brick and mortar locations. In general, at the point of sale, the customer may have previously configured or may be asked at the time of sale as to whether she wishes to receive an e-receipt. By selecting this option, the merchant will send an electronic communication in the form of an e-receipt to the customer's designated email address. Here again, the e-receipt will typically include a list of services and/or products purchased with SKU level data, and other parameters, as well as information about the merchant, such as name, address, phone number, store number, web address, and the like.

Various merchants now also provide online customer accounts for repeat customers. These online customer accounts may include purchase history information associated with the customer accessible by the customer via ID and passcode entry. Purchase history provides detailed information about services and products purchased by the customer including information found on order confirmations and shipping confirmations for each purchase. Online customer accounts are not limited to online purchases. Many merchants also provide online customer accounts for customers that purchase products at brick and mortar locations and then store these transactions in the customer's online account.

For the most part, order confirmations, shipping confirmations, e-receipts, and other electronic communications between merchants and customers are used only by the customer as proof of purchase and for monitoring receipt of purchased items (i.e., for archival purposes). However, there is significant data that can be gleaned from this electronic information for the benefit of the customer, so that the customer may have detailed information regarding purchase history, spending, and the like.

The general concept is to retrieve such electronic communications from the user or the entity, parse the data in these electronic communications for activity information, and associate the activity information from the electronic communications with the corresponding activities. Therefore, the user may allow the institution to access the user's e-mail account, entity accounts, or stored e-receipts in order to access information related to electronic communication for a transaction, or otherwise allow the entity to send the e-receipts to the institution directly. The financial and social management system 1 may be able to identify activity information in the e-receipts related to the specific products and associated individual costs within the transaction, a time associated with the transaction, as well as the actual location associated with the transaction (e.g., location of show, concert, or game for which tickets were purchased, or the like), or other activity information described herein.

In the context of an online purchase, the electronic communications may take the form of purchase order confirmations provided as a web page or as an email or as both. In some, embodiments, the merchant computing system may provide a web page purchase order confirmation, and advise the customer to either print, electronically save, or book mark the confirmation web page. The purchase order confirmation is essentially an e-receipt for the online purchase transaction. The order confirmation includes detailed information regarding the products or services purchased, such as for example, in the case of a product, SKU code level data, as well as other parameters associated with the product, such as type/category, size, color, and the like, as well purchase price information, information associated with the merchant, and the like. The merchant computing system may also send other subsequent communications, such as communications confirming shipment of the order, which typically includes the same information as the purchase order confirmation, and in addition, shipping date, tracking number, and other relevant information regarding the order. In the context of an in-store purchase, the merchant computing system may send an e-receipt comprising information similar to that of the purchase order confirmation. In some instances, the customer may actually receive a paper receipt, which the customer may choose to scan into an electronic form and save in a storage device. In the description herein, the term e-receipt may be used generically to refer to any communication or document provided by a merchant to a customer relating to a purchase transaction.

As is understood, once the purchase transaction data has been extracted, various information regarding a particular purchase transaction is now known, such as merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like. This data can be used to enrich the activities that are described in further detail herein.

As illustrated by block 106, the financial and social management system 1 may determine activity information for the one or more activities related to the location of the one or more transactions, based at least in part on the sources of information accessed. For example, as previously discussed the financial and social management system 1 may determine the location of the user at the same or similar time at which the user participated in one or more activities based on the user's mobile device, based on the time and date at which the user indicated he/she was located within a social networking account, based on an e-receipt, or other like information.

Block 108 of FIG. 1 illustrates that the financial and social management system 1 may determine activity information for the one or more activities related to social relationships the user may have with other users for the one or more activities. For example, as explained in further detail later a first user 4 may be identified as being located at an entity at a particular point in time (e.g., through the use of the mobile device with the location determining device, or other location determination such as social networking location indications). The financial and social management system 1 may identify all of the other users (e.g., second user 6, third user, fourth user, or the like) that made transactions or were located at or near the location of the entity at the same or similar time as the first user 4. As such, the financial and social management system 1 may access the first user's social networking account to determine if the other users are listed as contacts (e.g., friends, followers, family, co-workers, or the like) within the social networking accounts, in order to determine the other users (e.g., the second user 6, the third user, or the like) that may be associated with the activity at the entity. In other embodiments, the financial and social management system 1 may identify users that were tagged at the same or similar locations, or in images taken or uploaded at the same time as the activity in order to determine other users to associate with the activity. In this way, the financial and social management system 1 may determine the other users to associate (e.g., tag) with the one or more activities.

Block 110 of FIG. 1 illustrates that the financial and social management system 1 determines activity information from the sources of information for the one or more activities related to the one or more entities. For example, a purchase may be made with an entity (e.g., restaurant 1), but the transaction information includes the name of the parent company of the entity (e.g., holding company 1). In order to provide entity information, the financial and social management system 1 may utilize e-receipts, entity names from social networking accounts, location information of the user, and Internet information related to the entity associated with the location, or the like. In this way the financial and social management system 1 may identify specific information about an entity when the information is not already included in the original transaction information.

As illustrated by block 112 in FIG. 1, the financial and social management system 1 determines activity information from the sources of information for the one or more activities related to one or more categories for the one or more activities. For example, e-receipts may provide category information for the products or services related to the user's one or more activities. In other embodiments, the user's social networking information, such as the locations at which the user indicates that he/she is located provides category information related to the entity and/or the products provided by the entity. For example, the user may indicate within a social networking account that he was located at an entity and the institution may determine a category associated with the entity (e.g., the entity may be certified within the social networking site and also listed as part of a category). In other embodiments category information may be determined by utilizing publicly available information regarding category information from the Internet. For example, the financial and social management system 1 may determine that the user is located at entity 1 and search the Internet to determine that entity 1 is listed as being a part of a coffee shop category (e.g., through a category code, website of the entity, or the like).

As illustrated by block 114 in FIG. 1, the financial and social management system 1 identifies images (e.g., icons, digital photographs, avatars, logos, or the like) that are related to an entity or a user associated with an activity, or the activity in general. For example, the financial and social management system 1 may access profile pictures, avatars, or other images associated with other users through the contacts a user has within the user's social networking accounts. Moreover, the financial and social management system 1 may also access public information (e.g., images on the Internet) to identify logos, photos, or other images associated with an entity for the one or more activities. Moreover, images may also be captured from e-receipts that are identified, for example in the user's e-mail accounts, from direct accounts with the entities, or other like accounts. In other embodiments, images may be captured from the user's mobile device, such as through the stored images on a user's mobile device.

As illustrated by block 116 in FIG. 1, the financial and social management system 1 receives an indication from the user to access the financial and social management application 15. In response, the financial and social management system 1 authenticates the user. Block 118 of FIG. 1 illustrates that the financial and social management system 1 displays one or more of the financial and social management interfaces described herein, such as the financial and social management overview interface 200, the activity list interface 500, activity location interface 700, activity social relationship interface 800 (or other like filtered activity list interface), package overview interface 1000, package image interface 1100, package transaction interface 1200, package social relationship interface 1300, an activity history interface 1600, activity review overview interface 1800, consumption interface 1900, or other like interfaces.

FIG. 2 illustrates one embodiment of the financial and social management overview interface 200. The financial and social management overview interface 200 may display a navigation bar that allows users to navigate through the financial and social management application 15. The navigation bar may include an activity selection 202 that allows the user to access activity lists, a package selection 204 that allows the user to access packages, a history selection 206 that allows user to view activity history and activity review interfaces, a deals selection 208 for offers (e.g., coupons, discounts, or the like) for products, or other like selection links. The financial and social management overview interface 200 may also include an activity list section 210, a package section 220, past activity section 230, or other like sections, which provide users an overview of activities and allows them to scroll through various activity lists, packages, or past activities.

As illustrated in the activity list section 210 the user may be able to view the activities associated with all of the user's accounts 212. This may include accounts that are located with other secondary financial institutions, to which the user may allow the primary financial institution to access in order to consolidate financial transaction information from multiple financial institutions into a single application. In other embodiments, the financial and social management application 15 may be hosted by a third party institution that is not a financial institution, but which consolidates account information from multiple accounts across multiple financial institutions. The activity list section 210 may also allow the user to view activities based on individual accounts (e.g., checking, savings, investment, equity line, or any other type of account involving the transfer of products, currency, or equivalent values) within a single institution or across multiple institutions.

As illustrated by the package section 220 the user may scroll through various packages that have been automatically created, or created manually by the user, in order to group the user's activities. The packages in the package section 220 may be displayed as package summaries 222 that include activity images, such as photographs, logos, or other like images, which relate to the activities in the packages. The package summaries 222 may also illustrate activity information associated with the activities in the packages, such as dates, locations, total money spent, or the like.

As illustrated by the past activity section 230 the user may scroll through various activities that the user may have engaged in over specific days, or other time periods in the past. The activities may be displayed as activity summaries 232 that include activity images and activity information as was described with respect to the package section 220. The activity lists, packages, and activity histories, as well as the associated interfaces will be explained in further detail below.

FIG. 3 illustrates an image integration process 300 for an activity list in accordance with one embodiment of the invention. As illustrated by block 302 in FIG. 3 the financial and social management system 1 receives an indication that the user (e.g., first user 4) participated in one or more activities. This may include transactions for products with an entity, transfers from other financial institutions, deposits from other users (e.g. within or outside of the financial institution), transactions with other users, or any other type of transaction that a user may enter.

As illustrated by block 304, the financial and social management system 1 identifies activity information for one or more of the activities. For example, as previously described the activity information may be a deposit of a check in the first user's account from another user (e.g., second user 4) and the identified activity information may be the identity of the second user 6. For example, the identity of the second user 6 may be determined from the information captured from an image of the check (e.g., scanned check, photo of the check, or the like). The name of the user on the check may be read from the image of the check. Alternatively, the transfer may be an electronic transfer from the second user 6 and the user's identity may be transferred electronically along with the amount of the transfer. In other embodiments of the invention the activity may be a transaction for a specific product or a transaction with a specific entity. The identified activity information may be the name of the product or the name of the specific entity (e.g., merchant, other user, or the like) that is determined from the transaction information sent to the institution after the user enters the transaction with the entity. In other embodiments, the product or entity may be identified through e-receipts, a social networking account, or other means as described throughout the specification herein.

As illustrated by block 306 in FIG. 3, the financial and social management system 1 identifies one or more images associated with one or more users for one or more activities. In the example of the check deposited by a first user 2 from a second 6 user in the first user's account, the financial and social management system 1 may access the first user's social networking accounts and search for contacts that match the identity of the second user 6 (e.g., using the name of the second user 6 identified from the check or other type of transaction). If a second user 6 is identified as a contact in the first user's social networking accounts, then the financial and social management system 1 may automatically use the image associated with the second user 6 (e.g., profile picture, or the like) as an image for the activity of the deposited check. In other embodiments of the invention the financial and social management system 1 may identify images of the second user 6 tagged in the first user's photos within the social networking account and utilize the photos or portions of the photos as the image associated with the activity (e.g., the deposited check transaction). In still other embodiments, the financial and social management system 1 may perform an image analysis of the profile picture to determine if the image is a picture of the second user 6, instead of a picture of another person, an animal, an object, scenery, or the like. The financial and social management system 1 may also compare multiple photographs to identify an accurate image of the second user 6, for example, making sure that the images tagged as the second user 6 are consistent with each other. Moreover, in some embodiments the financial and social management system 1 may prompt the first user 1 to select an image of the second user 6 or confirm that an image determined automatically is in fact the second user 6. Selection of an image for the second user 6 may also occur when there are multiple users with the same identity within the contacts of the first user's social networking accounts. In some embodiments of the invention contacts may also be identified through the user's contact lists in the user's e-mail accounts, contacts lists in the user's mobile devices, or other contact lists. In addition to capturing images associated with the contacts in the contact lists, other activity information about the contacts from the contact lists may also be utilized by the financial and social management system 1 (e.g., used to tag other users as explained in further detail later).

Block 308 of FIG. 3 illustrates that one or more images from an activity with an entity (e.g., merchant) are also identified. For example, the financial and social management system 1 may search the Internet for an image related to a merchant, such as a logo of the merchant on the merchant website, or an image of the merchant store captured from the Internet or the social networking account of the first user 4. In some embodiments, the user may have identified the merchant (e.g., follows, likes, is a fan of, or is otherwise is associated with the merchant) in the user's social networking accounts and the images may be determined from a social networking page of the merchant. In other embodiments of the invention, an image (e.g., logo, picture of store, or the like) associated with the merchant may be stored within the financial and social management system 1, for example, by the financial institution systems 10 as discussed in further detail later. In other embodiments the user's photos in the user's mobile device may be used as an image for the merchant (e.g., photo taken at the same or similar time as the transaction). Again, the user may be prompted by the financial and social management system 1 with one or more images associated with the merchant before the image is associated with the activity and displayed in the activity list interface 500, as discussed in further detail later.

As illustrated by block 310 in FIG. 3, the financial and social management system 1 may also identify one or more images associated with a product involved in an activity. The image for the product may be determined by the financial and social management system 1 from a search of the Internet for an image related to the product, such as a logo of the product from a website related to the product, or an image of the product captured from the Internet or from a social networking account of the user. In some embodiments, the user may have identified the product (e.g., follows, likes, is a fan of, or is otherwise associated with the product) in the user's social networking accounts and the images may be determined from a social networking page associated with the product. In other embodiments of the invention, an image (e.g., logo, picture of the product, or the like) associated with the product may be stored within the financial and social management system 1, for example, by the financial institution systems 10 as discussed in further detail later. In other embodiments the user's photos in the user's mobile device may be used as an image for the product (e.g., photo taken at the same or similar time as the transaction). Again, the user may be prompted by the financial and social management system 1 with one or more images associated with the product before the image is associated with the activity and displayed in the activity list interface 500.

In still other embodiments of the invention, as illustrated by block 312, other images may be associated with the activity, such as but not limited to category images, location images, or personal images captured by the user. For example, with respect to category images, if a user makes a purchase for coffee and an image for the coffee merchant is not available (e.g., coffee merchant does not allow use of the image, coffee merchant does not have an image on the Internet, no image in the user's social networking account is available, or the like) a category image may be associated with the activity. The category image may be a general icon that is used for food and beverages, or more specifically coffee shops (e.g., an image of coffee beans, a cup of coffee or the like). With respect to location images, an image of the city, or other location, in which the user made the purchase may be used in association with the activity. In some embodiments of the invention a photo of the city (or other location) in which a user entered a transaction may be used instead of an image of the user, product, merchant, or the like. Personal images may also be associated with an activity instead of or in addition to a user, product, merchant, or other like image. For example, instead of using a logo for a merchant, the financial and social management system 1 may capture an image taken at the same or similar time as the transaction from a social networking account of the user, and utilize the image with the activity (e.g., utilize a family photograph at restaurant 1 from social media instead of the logo of the restaurant.)

In some embodiments of the invention the financial and social management system 1 may capture images from the first user's social networking accounts or mobile phone that were taken, uploaded, or the like, at the same or similar time as the time stamp of the transitions, or that may otherwise reference the activity. Images may be taken by a mobile device, camera, or other device that include not only a time stamp associated with the image, but also a location stamp (e.g., GPS stamp of the picture) associated with the image. For example, if a user makes a purchase with entity 1, takes a picture of the purchase, and uploads the picture to a social networking site, the financial and social management system 1 may identify the photo as being related to the purchase through the stored or uploaded photo containing location stamp. For example, if the location stamp of the photo and the location of the activity matched the photo may be associated with the activity. In other embodiments of the invention, if the photo is time stamped, the timestamp of the photo may be compared with the transaction time and associated with the activity if the transaction times are same or similar (e.g., within a specific range). For example, if the transaction time of the purchase and the uploaded photo occurred within, for example, 10 minutes of each other, the financial and social management system 1 may identify that the photo should be linked with the purchase in the first user's account. In other embodiments, if the photo was taken or uploaded outside of the time period of the activity, but the social networking account specifically referenced the name of the store, product, or location in the description of the picture, the photo may also be associated with the activity.

As illustrated by block 314, the financial and social management system 1 displays an activity list with the one or more activities, the associated activity information, and the associated one or more images in the interfaces, as described throughout this specification.

It should be understood that in some embodiments of the invention any images determined for an activity may be stored and utilized again in the future without having to identify the image again. For example, a logo of a restaurant is captured and approved by the user the first time the activity occurs, and all subsequent transactions with the restaurant will use the same image. However, in some embodiments, financial and social management system 1 may determine images for each activity as they occur in the event that the images related to the activities change over time. For example, images are determined for each activity in order to make sure an image of a product has not changed, a profile picture of a user has not changed, or the like.

As previously discussed herein other types of images may be associated with an activity in an activity list, such as card art from the users involved in the transaction, check art from the checks involved in the transaction, or other personalized data of the users associated with a transaction. For example, check art associated with a deposit of a check from user 2 in an account of user 1 may be associated and displayed with the activity of the deposit of the check in the account of user 1.

In still other embodiments of the invention the user may request that specific images be associated with a transaction on a one time, permanent, or semi-permanent basis. For example, the user may request that images for a location, user, entity, category, or period of time from public sources may be associated with an activity. The user may select an image from the Internet, from the user's camera roll on a mobile device, or like, and the image may be associated with the activity.

In still other embodiments of the invention images from an e-receipts may be associated with an activity when the financial and social management system 1 has identified an e-receipt that is related to an activity. The images used may come from the e-receipt, a link provided in the e-receipt, or the like.

In addition, the financial and social management system 1 may also be able to identify the browsing history of user and use the browsing history to associate additional activity information and images with an activity. For example, right before a user made a purchase the financial and social management system 1 may identify that the user was searching for a product or entity over the Internet. As such, the financial and social management system 1 may be able to associate images from the browser history (or other activity information) at the time of the activity or just before the time of the activity with the activity that the user subsequently entered into or previously entered into at the same or similar time. For example, the user may have searched for TVs and within the next five minutes made a purchase of a TV. Therefore, an image of the TV in the user's browser may be associated with the activity related to a large purchase that occurred at the same or similar time as the time of the browser history of the user.

In some embodiments of the invention, images may also be captured from the wish lists of users, which can be compared to activities in order to capture images from the wish list and associate the images with the activities in the financial and social management system 1.

In addition to the various ways of capturing images, which have been described above, activities may be tagged with activity information in the same or similar way that has been described with respect to associating images with activities, which is described in further detail below.

FIG. 4 illustrates a tagged relationship process 400, in accordance with one embodiment of the invention. As illustrated by block 402 in FIG. 4 the financial and social management system 1 receives an indication that the user (e.g., first user 4) participated in one or more activities. As previously discussed the activities may be any number of different types of transactions associated with a user's financial accounts.

As illustrated by block 404 of FIG. 4, the financial and social management system 1 accesses activity information related to the location and time of the one or more activities. This occurs in a same or similar way as was previously discussed with respect to capturing activity information and images for the activity list described in FIG. 3. For example, the location and time of an activity in some embodiments may be provided in transaction information that a merchant sends to an institution to complete a transaction. However, in some embodiments the transaction information may not include one or more of the location, date, and time information, or this information may otherwise fail to be correct or have enough specificity. Therefore, in other embodiments, the financial and social management system 1 may utilize a location determining device in a mobile device of the user (e.g., first user 4) to capture the approximate location and time of a transaction in which the user first user 4 entered. In still other embodiments of the invention the user (e.g., first user 4) may allow access to the user's social networking accounts, such that the financial and social management system 1 may access the first user's social networking accounts in order to identify locations, times, images, and other like information related to an activity of the user. For example, if a first user 4 entered into a transaction with an entity that did not provide location information (e.g., food truck that travels around to different areas), and the first user 4 also used a social networking account to indicate that the user was located at a specific area when making the purchase, the financial and social management system 1 may supplement the transaction information received from the merchant with other activity information identified using the first user's social networking accounts (e.g., the purchase related to the food truck was made at a specific location).

In other embodiments of the invention a user's calendar (e.g., electronic calendar) may be utilized to identify the location of the user during an activity, as well as other users associated with the activity, or other general information about the activity. For example, if the user entered a transaction at 1 pm, the financial and social management system 1 may access the user's calendar to identify that the user was having lunch at noon with two other people, and then associate the location of the lunch (e.g., restaurant 1) and the other users (e.g., second user 6 and a third user) from the calendar information with the activity (e.g., the purchase made at 1 pm). The calendar may also be used to identify images that may be associated with the activity, as previously described with respect to FIG. 3.

As illustrated by block 406 of FIG. 4, after identifying the location, date, and time that a first user 4 participated in one or more activities, the financial and social management system 1 may identify and tag one or more users (e.g., a second user 6) as being associated with one or more of the first user's activities in a social relationship tag (e.g. user tag). As previously described, the financial and social management system 1 may automatically determine the users to tag by identifying other users located at the same or similar location as the first user 4 at the same or similar time as the activity of the first user 4. The location of the other users is determined in the same way as described with respect to the first user 4, such as through the transaction information in which the other users were engaged, the location determining devices (e.g., GPS) of the other users, the social networking accounts of the other users, e-mail accounts, or the like. The financial and social management system 1 may then identify if the other users are contacts of the first user 4 through either the first user's social networking accounts or the other user's social networking accounts. If the other users are contacts and are also located at the same location as the first user 4 at the time of an activity associated with the first user 4 or the other users, then it is likely that the first user 4 and the other users are associated. As a result the financial and social management system 1 may automatically tag the one or more other users as being associated with the first user's activity, or otherwise present a proposed user tag to the first user 4 for acceptance or denial of the user tag. In other embodiments of the invention the financial and social management system may simply identify that a first user 4 entered an activity at a particular time or location, and identify other users in the social networking accounts of the first user that were tagged at the same location and time, or identified in images taken or uploaded at the same location and time, and associate the other users with the activity of the first user 4.

As illustrated by block 408, the financial and social management system 1 identifies and tags one or more locations associated with the one or more activities. The locations for a particular activity may change or vary based on the type of activity. For example, when purchasing food at a restaurant or a product at a particular store, the location of the activity is likely the restaurant or the location of the store. This location as previously discussed with respect to block 404 may be determined using the transaction information sent to the institution, social networking account information, using a location determining device in the user's mobile phone, or the like.

In some embodiments of the invention, some merchants do not include location information in the transaction information, the social networking information may not be available, the location determining device may not be active, or the location may not be related to the location of the purchase. For example, when purchases are made for products over the Internet that are later delivered to the customer, or when purchases are made for future events or products, the location tag for the transaction may be different than the location of the purchase. With respect to purchases made over the Internet, the entity associated with the activity may be located hundreds or thousands of miles away from the user entering the transaction. As such, the location associated with the activity may be more appropriately described as the shipping address, or purchase address, and not the location of the entity. For example, a first user 4 may make three purchases over the Internet with entity 1 from the first user's primary residence. One purchase may be for the first user 4 and it is shipped to the first user's primary residence, and as such either the addresses associated with the account (e.g., primary residence) or the shipping address may be the tagged location of the activity. The second purchase may be for the first user 4 and it is shipped to the first user's vacation home, and as such the shipping address should be identified as the tagged location. The third purchase may be a gift for family or friends and it is shipped to a location unrelated to the first user 4, and as such, the first user's primary residence may be the tagged location. In order to determine the correct location tag for which to tag the activity, the first user 4 may allow the financial and social management system 1 to access the user's e-mail accounts, or other types of accounts, in order to access e-receipts from the user. The financial and social management system 1 may identify information from the e-receipts that indicates the primary residence location, shipping location, the name associated with the address (e.g., could indicate whether or not the purchase was a gift), and other like information. In other embodiments of the invention, at the time of purchase, or at another point in time, the user may authorize that the entity involved in the activity may automatically send an electronic receipt of the activity information (e.g., transaction information) to the institution associated with the account that the user is utilizing to participate in the activity.

As illustrated by block 410 in FIG. 4, the financial and social management system 1 identifies and tags one or more entities associated with the one or more activities. This information may be determined when the user makes a purchase and the entity sends the transaction information, including the name of the entity, to the financial institution. For example, a fast food chain restaurant may provide the entity name to the financial institution along with the cost of the purchase. However, in some embodiments some entities may be grouped under a parent company, or otherwise may use a name unaffiliated with the actual entity, for example some restaurants may be grouped under a holding company. As such, the name of an entity included in the transaction information may be the holding or parent company and not the particular entity for which the activity relates. In some embodiments of the invention, the entity tag may be determined by comparing the location of the user, based on a location determining device of the user's mobile device or other location determination, with the entity at the location of the user at the time of the activity (e.g., through the Internet). As also previously discussed, the entity may also be determined from social networking accounts of the user, e-receipts, accounts with the entity itself, or other like accounts for which the user has allowed the financial and social management system 1 access. The financial and social management system 1 can determine the entity for a transaction by accessing one or more of the user's accounts with the user's permission.

As illustrated by block 412 in FIG. 4, the financial and social management system 1 identifies and tags one or more categories associated with the one or more activities. Categories for products or entities may be identified in a number of ways including entity and product codes, such as but not limited to merchant category codes (MCC), stock keeping units (SKU), bar codes, QR codes, universal product codes (UPC), or any other type of codes. The product or category codes may be included in the activity information transmitted between the entity and the institution for the activity. The entity or product codes may also be included in e-receipts sent to the user or institution, and thus, extracted from the e-receipts as previously described herein. In other embodiments of the invention the financial and social management system 1 may determine categories for products or entities by identifying the entity or product, as previously described herein, and associating the entity or product with a category through stored categories, searching the Internet for categories, or other like means. Moreover, in some embodiments of the invention the financial and social management system 1 may access a user's social networking account to identify a product or entity that was liked, followed, or otherwise identified by the user through a tag, description, or the like in the user's social networking account at the same or similar time as the activity and associate a category with the activity based on the product or entity.

As illustrated by block 414 in FIG. 4 an activity list 510 is displayed to the user in an activity list interface 500 (or other interface) as illustrated in FIG. 5 described below. As illustrated by block 416 the financial and social management system 1 may receive an indication from the user (e.g., first user 4) to update the activity list by adding, deleting, or editing one or more tags associated with the one or more activities. In one embodiment, proposed tags are presented to the user for user acceptance before the tags are added to the one or more activities. Furthermore, the user may be able to opt in or out of the tagging features of the financial and social management system 1.

In some embodiments of the invention, software may be utilized to identify people, locations, landmarks, products, entities, or the like within images in the social networking accounts of the users, stored databases, the Internet, or other sources of information, in order to help to determine activity information related to activities or images to associate with the activities. For example, facial recognition software may be used to identify users in images (e.g., in the foreground or background of the image) that might be associated with an activity in order to tag the user as being associated with the activity. In another example, a landmark, landscape, text (e.g., sign, caption, or the like), or other like feature within the image may be used to determine a location, entity, or category tag to associate with the activity.

FIG. 5 illustrates an activity list interface 500, in accordance with an embodiment of the invention. As illustrated in the activity list interface 500 the navigation bar indicates that the activity list is being displayed in the interface. The activity list interface 500 may include an account selection 502, such as a menu, link, drop-down selection, or the like to allow the user to switch between displaying the activities for all accounts, a single account, or multiple accounts across multiple institutions. The activity list interface 500 may also include a calendar selection 504 that illustrates the activity list in calendar form.

The activity list interface 500 may include an activity list 510 that is sorted based on the day of the transaction. The activity list 510 may also include an account identifier 512 illustrating the institution name, institution image, or account number indicating the account associated with the activity. As illustrated in the activity list 510 multiple accounts from multiple institutions may be provided in the activity list interface 500. For example, the user may allow the financial and social management system 1 to access accounts at other financial institutions and include activities for the accounts at the other financial institutions in the activity list 510 (e.g., Bank 1, Bank 2, or the like).

The activity list 510 may also include an entity identifier 514 illustrating the entity image, entity name, or entity number indicating the entity associated with the activity. As illustrated in the activity list 510 the entity may be different merchants or users engaged in various activities (e.g., transactions, deposited checks, money transfers, account transfers, account credits or debits, or the like). The activity list may also include activity information captured from various sources, such as an entity name 516, activity category 518, activity time 520, activity location 522, activity cost 524, or other like activity information.

In some embodiments of the invention the activity list 510 may also include an activity tag section 530, which may be expanded or hidden in the activity list. Within the activity tag section 530 the tags may be automatically or manually added to the activity as previously discussed with respect to FIG. 4 and elsewhere throughout this specification. As illustrated the tags may include user tags 532, location tags 534, entity tags 536, and category tags 538. In other embodiments of the invention, other tags may be included, such as but not limited to time of day tags (morning, afternoon, evening, late night, or the like). As illustrated in the activity tag section 530 the user may also have the ability to connect additional accounts 542, view packages 544 in which the activity is located, edit images 546 associated with the activity, and edit tags 548 in order to add, delete, or change tags.

As further illustrated in the activity list 510, the activities may be broken down into individual products within a products section 570 of the activity list 510. The products section 570 may be expanded or hidden as desired by the user. Typically only a total cost of an activity is transmitted between an entity with which a user entered a transaction and the financial institution with which the user's account is located. Therefore, the institution often does not have a list of the products associated with the activity. As previously discussed the user may allow the institution to access the user's accounts, such as but not limited to, e-mail accounts, entity accounts, social networking accounts, or the like in order to allow the financial and social management system 1 to determine a list of products associated with an activity (e.g., through e-receipts, past orders within an entity account, references to products in social networking accounts at the same or similar time as the activity, or the like). Individual products within the products section 570 may have images, as well as tags of locations, categories, entities, or the like associated with the individual products within the activity. For example, a TV and cable may be purchased through entity 1, however, entity 1 is only a distributor and the TV is actually produced by entity 5, while the cables are produced by entity 6. As such not only is the activity tagged with entity 1, but the actual products within the activity may be tagged with entity 5 and entity 6 respectfully.

FIG. 6 illustrates an activity filter process 600, in accordance with an embodiment of the invention. As illustrated by block 602 of FIG. 6, the financial and social management system 1 receives an indication of one or more activities in which a first user participated, and tags the one or more activities with location, user, entity, category, or other like tags associated with one or more of the activities, as previously described with respect to FIG. 4.

As illustrated by block 604 of FIG. 6, the financial and social management system 1 receives an indication from a user (e.g., first user 4) to filter activities by location and display the filtered activities in an activity location interface 700 as illustrated in FIG. 7. The activity location interface 700 may include a navigation bar, a location image section 710, a relationship section 720 (e.g., location map, or the like), and an activity list section 730. A location header 702 may also be provided in the activity location interface 700, which identifies the location of the one or more activities.

The location image section 710 may include a photograph of the city, area, section of a city, or other like location that is related to the one or more activities. The image may be determined as previously described with respect to FIG. 3, or another like means. The location image section 710, or another section within the activity location interface 700 my include an activity summary 712 illustrating the total amount spent at the location, date range associated with the location activities, or other activity information related to the activities at the location.

With respect to the relationship section 720 of the activity location interface 700, the relationship section 720 may be a location map illustrating the locations of the activities on a map. The map may be interactive and may include markers 722 (e.g., pins, flags, pointers, or the like) that not only indicate the location of the activity, but also may provide activity information, such as but not limited to, the products purchased, the costs, the date and time of the activity, the name of the entity, or the like. The activity information may be identified by rolling over or selecting the one or more markers. In other embodiments of the invention, the relationship section 720 may include other activity information, such as amounts spent for grouped time periods, users, entities, categories, or the like within the specified location.

With respect to the activity list section 730, the activity list is filtered to only display activities within the one or more selected locations, but may have the same information as previously described with respect to the activity list interface 500 illustrated in FIG. 5.

As illustrated by block 606 of FIG. 6, the financial and social management system 1 receives an indication from a user (e.g., first user 4) to filter activities by one or more users and display the filtered activities in an activity social relationship interface 800 as illustrated in FIG. 8. The activity social relationship interface 800 may comprise a navigation bar, a social relationship image section 810, a relationship section 820 (e.g., word block, location map, or the like), and an activity list section 830. A social relationship header 802 may also be provided in the social relationship interface 800 illustrating the one or more users included in the social relationship interface 800. As illustrated in the social relationship header 802 of FIG. 8, only activities associated with a single user (e.g., USER 2) are displayed, however, the first user 4 may also filter the social relationship interface 800 based on groups of two or more users. As such, the social relationship header 802 may include the names of more than one user.

The social relationship image section 810 may include one or more photographs, or other type of image, associated with the one or more users. The images may be determined and included in the social relationship image section 810 as previously described with respect to FIG. 3. The social relationship image section 810, or another section within the social relationship interface 800 may include an activity summary 812 illustrating the total amount spent with one or more users, date ranges for the activities associated with the one or more users, or other activity information related to the activities associated with the one or more users included in the social relationship interface 800.

With respect to the relationship section 820 of the social relationship interface 800, the relationship section 820 may be a word map as illustrated in FIG. 8. The word map may illustrate the most important categories for the activities associated with the users. In other embodiments of the invention the relationship section 820 may be a summary of the largest purchases, most purchases, categories of purchases, or the like with the one or more other users, and the associated amounts spent with respect to each. In other embodiments the relationship section 820 may be a location map illustrating locations of the activities on a map that are associated with one or more other users. As described with respect to FIG. 7, the location map may be interactive and may include markers (e.g., pins, flags, pointers, or the like), which not only indicate the location of the activity, but also may provide activity information such as the products purchased, the costs, the date and time of the activity, the name of the entity, or the like. The activity information may be identified by rolling over or selecting the one or more markers.

With respect to the activity list section 830 the activity list is filtered to only display activities associated with one or more users, but may have the same information as previously described with respect to the activity list interface 500 illustrated in FIG. 5.

As illustrated by block 608 of FIG. 6, the financial and social management system 1 receives an indication from a user to filter activities by one or more entities and display the filtered activities in an activity entity interface. The activity entity interface is not displayed herein, but may be the same as or similar to the location activity interface 700 and the social relationship interface 800 as illustrated and described with respect to FIGS. 7 and 8. The activity entity interface may include an entity image section providing images associated with the entity as previously described herein. The activity entity interface may also include a relationship section providing activity information in a location map illustrating the location of transactions associated with the entity. Activity information may also be displayed in a relationship section through the use of word maps, categories of products with the associated amounts spent for the categories, or the like. The activity entity interface may also include an activity list filtered to only display activities associated with one or more entities, but the activity list may have the same or similar information as previously described with respect to the activity list interface 500 illustrated in FIG. 5.

As illustrated by block 610 of FIG. 6, the financial and social management system 1 receives an indication from a first user 4 to filter activities by one or more categories and display the filtered activities in an activity category interface. The activity category interface is not displayed herein, but may be the same as or similar to the location activity interface 700 and the social relationship interface 800 as illustrated in and described with respect to FIGS. 7 and 8. The activity category interface may include a category image section providing images associated with a product, category of products, services, category of services, or the like as previously described herein with respect to FIG. 3. The activity category interface may include a relationship section providing activity information displayed through the use of one or more categories with associated amounts spent within each of the one or more categories. In other embodiments the relationship section may provide activity information in a location map illustrating the location of activities associated with the category. The activity category interface may also include an activity list filtered to only display activities associated with one or more categories, but the activity list may have the same or similar information as previously described with respect to the activity list interface 500 illustrated in FIG. 5.

As illustrated by block 612 of FIG. 6, the financial and social management system 1 displays the one or more interfaces from block 604 through 610 to the user automatically or upon request by the user. As illustrated by block 614 of FIG. 6, the financial and social management system 1 receives an indication from the user to update the filtered activity lists in one or more of the filtered interfaces from block 604 through 610. As was previously discussed with respect to respect to the tagged relationship process 400 illustrated in FIG. 4 and the activity list interface 500 illustrated in FIG. 5, the user may add, remove, or edit the activities or the tags in the filtered activity lists illustrated in the various interfaces.

In other embodiments of the invention the activities may be filtered based on the expenses (e.g., costs for a purchase) associated with an activity or the time at which the activities occurred during the day (e.g., morning, afternoon, night, a specific hour, or the like). As such, the user may request to filter the activities based on purchases that fall within a cost range of the activities. In some embodiments the activities may be filtered using a combination of the activity information. For example, the user may request to filter all activities related to purchases at restaurants (e.g., category filter), which occurred during lunch time (e.g., time of day filter), and were in the range of $10 to $20 (e.g., cost filter). This allows the user to view all of the activities that the user made and the associated images, users, categories, locations, and entities for the activities that meet the user's filters in order to identify spending habits and allow the user to adjust spending.

FIG. 9 illustrates a past package process flow, in accordance with an embodiment of the invention. As illustrated by block 902 of FIG. 9 the financial and social management system 1 receives an indication that a first user participated in one or more activities over a period of time or for a particular location.

As illustrated by block 904 of FIG. 9, the financial and social management system 1 accesses activity information related to the location and/or time of the one or more activities. The location and time may be determined as previously discussed herein, such as but not limited to the transaction information between the entity and the user, a location determining device in the user's mobile phone or other device, the social networking accounts of the user, e-receipts, or the like.

As illustrated in block 906 of FIG. 9, the financial and social management system 1 groups the one or more activities into activity packages based on the activity location and/or time period information automatically or manually. The time period may be determined automatically based in part on the activity information associated with the location, users, entities, or categories related to the one or more activities. For example, the financial and social management system 1 identifies that the user has participated in one or more activities in city 1 by identifying that the user has entered into transactions within the location of city 1. Furthermore, the financial and social management system 1 may determine a time period for the package by identifying transactions before and after any transactions in the location of city 1 and limiting the time period to the first and last transactions made in the location of city 1 (or any other transactions on the same day, or the like). The financial and social management system 1 may also identify activities that occurred outside of the time period that may be included in the package. For example, if the package is a trip, the financial and social management system 1 may identify the cost of the flights associated with the package using e-receipts, or other means described herein, and add the entity and costs of the flights to the package. In other embodiments of the invention, the financial and social management system 1 may identify that the user made a number of purchases the day before arriving in city 1, such as for example at gas stations and a hotel that may be identified as travel costs associated with the trip, and thus, the financial and social management system 1 may add these purchases to the package even though the purchases were not made in the location (e.g., city 1) associated with the package.

As illustrated by block 908 of FIG. 9, the financial and social management system 1 accesses one or more of the user's social networking accounts and identifies images associated with one or more of the activities in the packages as previously described herein with respect to FIG. 3. For example, the financial and social management system 1 may identify images posted on social networking accounts of the user either at the same time or at the same location as the time period and location of the package or the one or more activates in the package. As such, images posted within the time period at the location associated with the package (e.g., photos uploaded during the trip), images tagged as being associated with the location outside of the time period of the package (e.g., photos uploaded after returning from the trip), or images posted at the same or similar time as activates outside of the location and time period that are added later (e.g., photos of the user at the time of the flight before the trip, photos of the user at locations on the way to the location, or the like) may be determined and/or added to package automatically or manually.

Block 910 of FIG. 9 illustrates that the financial and social management system 1 may access a first user's social networking accounts to identify one or more other users associated with the one or more activities or the package, as previously described in FIG. 4 with respect to identifying and tagging users. In some embodiments this may comprise allowing the financial and social management system 1 to access the first user's 4 social networking accounts, and thereafter, the financial and social management system 1 determines contacts that were tagged or otherwise associated with the first user 4 during the same time period or location that is covered by the package. In some embodiments, however, a first user 4 may associate (e.g., tag) another user in a social networking account without the other user being present at the activity, and as such the financial and social management system 1 may identify users that should not be associated with a particular package. Therefore, in some embodiments, if a second user 6 is tagged in a photo in the first user's social networking accounts within the time period or location of the package, but the second user 6 has not entered into transactions within the location or time period of the package, then the second user 6 may not be included in the package.

In other embodiments, as illustrated by block 912, the financial and social management system 1 may identify one or more other users (e.g., second user 6) associated with one or more activities in the package. For example, the financial and social management system 1 may identify transactions made by other users at the same or similar time as the first user 4 at the same or similar location. Then the financial and social management system 1 may access the first user's social networking accounts to identify if these other users (e.g., a second user 6) are contacts with the first user 4 in the first user's social networking accounts, and as such, may be identified as being associated with the first user 4 in the package. The other users (e.g., second user 6) may then be associated with (e.g., tagged, or the like) the package or the one or more activities within the package.

As illustrated by block 914, the financial and social management system 1 may receive an indication from the first user to access the financial and social management application 15, and the financial and social management system 1 authenticates the first user 4. As illustrated by block 916, the financial and social management system 1 displays the one or more packages to the user containing the grouped activities, tagged users, and associated images. In some embodiments, as illustrated by block 918, the financial and social management system 1 may receive an indication from the user to update the one or more packages or activities within the packages by adding, removing, or editing the activities, tagged users, or images for the individual activities or the packages in general.

In other embodiments of the invention, instead of, or in addition to being automatically created, the packages may be manually created. For example, the user may select a date range for a package, a location for the package, activities to include in the package, or users to add to the package, in order to create a package or supplement an automatically created package.

FIG. 10 illustrates a package overview interface 1000, in accordance with an embodiment of the invention. The package overview interface 1000 may include a list of packages summaries 1010 (e.g., first package 1002, second package 1004, third package 1006, or the like). A package summary 1010 may include for example, a package name 1012, package date 1014, package location 1016, package cost 1018, package activities 1020 (e.g., transactions with entities and associated costs of the one or more transactions within the package), and package images 1022 (e.g., photos, icons, logos, or the like). The package summary 1010, in some embodiments may also include one or more users associated with the activities in the package (e.g., tagged, or the like), or one or more categories associated with the activities in the package. Additional details about the package may be viewed by selecting on one of the package summaries 1010.

FIG. 11 illustrates a package image interface 1100, in accordance with an embodiment of the invention. The package image interface 1100 comprises a package name header 1102, a package map section 1110, and a package information section 1120. The package name header 1102 provides the name of the package. The package map section 1110 may include a location map illustrating the locations of the activities in the package on a map. The map located in the package map section 1110 may be interactive, and may include markers 1112 (e.g., pins, flags, pointers, or the like) that not only indicate the locations of the activities, but also may provide activity information such as the products purchased, the costs of the products, the date and time of the activities, the name of the entities associated with the activities, users associated with the activities, or the like. The activity information may be identified by rolling over or selecting the one or more markers 1112. The package map section 1110, or another section, may also comprise a package information section 1114 illustrating the package cost (e.g., the total cost of the activities in the package), and a package date (e.g., date ranges of the activities), or other like information.

The package information section 1120 may include an image tab 1122, an activity list tab 1124, and a user tab 1126. As illustrated in FIG. 11, when the image tab 1122 is selected the one or more images associated with the package are displayed. As illustrated in FIG. 12, when the activity list tab 1124 is selected an activity list 510 is displayed, as was previously described with respect to the activity list interface 500 illustrated in FIG. 5. As illustrated by FIG. 13, when the user tab 1126 is selected the users associated with the package are displayed along with images of the users as previously discussed with respect to the image integration process 300 in FIG. 3 and the activity list interface 500 in FIG. 5.

FIG. 14 illustrates a proposed package process 1400, in accordance with an embodiment of the invention. As illustrated by block 1402, the financial and social management system 1 receives an indication that the user would like to set up a package for one or more activities. The indication may include one or more time periods, or one or more locations associated with the package. For example, a first user 4 may select a weekend for a trip and a location for the trip.

As illustrated by block 1404, the financial and social management system 1 may receive an indication from a user to set up a budget for the package of one or more activities on the trip. For example, a first user 4 may set a budget of $2,000 for the trip.

Block 1406 of FIG. 14 illustrates that the financial and social management system 1 receives and indication from a user to allocate funds from one or more user accounts to the package. For example, a first user 4 may allocate $500 from a savings account, $500 from a checking account, $500 from an investment account, and the last $500 may be selected as having to be saved for the trip.

As illustrated by block 1408 the user may group one or more past activities into the package. For example, a first user 4 may indicate that the plane ticket has been already purchased for a cost of $500, and assign the activity of the plane ticket and the associated cost to the package created. In other embodiments of the invention, the assignment of activities to the package may be performed automatically by the financial and social management system 1 (e.g., plane ticket is automatically associated based on the location activity information). Furthermore, as illustrated by block 1408 the user may also add proposed future activities to the package. For example, the first user 4 may have booked a hotel for the trip for $250 a night for two nights, but the user's account is not charged until the stay at the hotel is completed. As such, the first user 4 may assign the cost of the hotel to the package as a future activity expense in order to budget for the package. In other embodiments of the invention the future cost may be assigned to the package automatically by the financial and social management system 1.

Block 1410 illustrates that the financial and social management system 1 receives an indication to associate one or more users with the package or with activities in the package. For example, the first user 4 may identify and tag users from previous activities within the first user's financial accounts. The first user 4 may also tag other users by selecting various users from the first user's social networking accounts. The financial and social management system 1 may also access the social networking accounts of the first user 4 to automatically tag user's associated with the package or the one or more activities in the package as previously described with respect to the tagged relationship process 400 of FIG. 4. The financial and social management system 1 may access the social networking accounts of the first user 4 to access images for the tagged users as previously described with respect to the image integration process 300 of FIG. 3, the tagged relationship process 400 of FIG. 4, and the activity list interface of FIG. 5.

In other embodiments of the invention, the financial and social management system 1 may access the first user's e-mail accounts, phone contact list, or other accounts to identify contacts, or otherwise receive e-receipts for activities or proposed activities, in order to tag users in the package. For example, the financial and social management system 1 may identify in an e-receipt for the flight associated with the package that the flight includes a second user 6, and thus, the financial and social management system 1 tags the second user 6 within the package. Moreover, as previously discussed the financial and social management system 1 may identify users to tag in the package as previously discussed with respect to the tagged relationship process 400 of FIG. 4 and the activity list interface of FIG. 5. That is, in one embodiment the financial and social management system 1 may identify users that are contacts with each other through the social networking accounts of the users, and also identify that users made similar purchases at the same or similar times and/or locations. For example, the financial and social management system 1 identifies that the first user 4 and the second user 6 are contacts, and both the first user 4 and the second user 6 have purchased the same flight to the same place. This information may be available to the financial and social management system 1 because both users may use the same financial institution, provide information from multiple financial institution accounts, allow access to e-receipts sent between the first user 4 and the second user 4 in the e-mail accounts of the users, or the like.

As illustrated by block 1412, the financial and social management system 1 receives an indication to associate one or more images with the package or with the one or more activities in the package. For example, as previously described herein with respect to the image integration process 300 of FIG. 3, images may be associated with proposed activities within the package. For example, the airline logo may be attached to the proposed flight activity in the package based on images captured from e-receipts from the airline, over the Internet, from the user's social networking accounts, from stored images in the financial institution, or the like. Furthermore, images of the identified location of the trip may be included in the package from various sources, for example, by retrieving images from the Internet, from e-receipts in e-mail accounts, from social networking accounts, or the like. Moreover, if the package has the same location, or has the same or similar activities as past packages or activities, images from the past packages or activities may be incorporated into the proposed package.

Block 1414 illustrates that the financial and social management system 1 receives an indication from the user to add, remove, or edit one or more users, images, activities, tagged activity information, or other like information within the packages.

As illustrated in block 1416 the financial and social management system 1 may add links to one or more activities within the packages. For example, a link to the first user's flight status may be included in the package in order to allow the user check the status of the flight as the trip approaches. The user may allow the links to be added by allowing the financial and social management system 1 to access an e-receipt or other linked information included in the first user's e-mail account, or other account (e.g., an account with the specific entity). In another example, the financial and social management system 1 may identify activities purchased before the trip, such as tickets to a game, and provide linked information in the package regarding the game (e.g., website of the team, directions from the hotel to the game, or the like). In some embodiments, the financial and social management system 1 may provide links for activities that are not yet included in the package in order to provide suggested offers for activities in which to participate while at or near the location associated with the package.

As illustrated by block 1418, the financial and social management system 1 may share the one or more packages with other users that may be involved with the trip. For example, a group of people may be involved in planning the trip and paying for aspects of the trip, and as such, the packages (but not the user's financial account information) may be shared with various users to budget and pay for the trip associated with the package. Multiple users may be able to add, delete, and edit information within the package in order to plan for a trip or other event (e.g., saving for a purchase, or the like). In some embodiments of the invention payments may be collected or disbursed from or to the users in the package by pulling or pushing funds between the financial accounts of the users within the package.

In some embodiments of the invention the packages, and in particular the past packages, may be exported to another file type, printed out, or the like, in order to create an expense report for a business trip, to share the activities with budgeting software, or to share the activities with other users (e.g., users on the trip, or the like).

In some embodiments of the invention the packages may be formed based on groups within the social networking accounts of a user. For example, a user may be a part of a group within a social networking account, such as a charity group, a fan group, alumni group, a group associated with a product, entity, user, or category, or another like group. The financial and social management system 1 may identify that one or more activities of the user may be associated with the group and information from the social networking group may be captured. For example, users within the group may be tagged as being associated with an activity. In other embodiments, other activity information, images, or other digital content may be captured from the group within the social networking account and associated with an activity.

In some embodiments of the invention the social networking accounts of a user may be utilized to not only identify activities in the past (e.g., past locations of the user) or current activities (e.g., current locations of the user), but may also have the ability to identify future activities (e.g., locations at which the user will be in the future). To the extent that a social networking account includes information about the user in the future, the financial and social management system may be able to capture the future information and associate this type of activity information with an activity, as previously described herein with respect to past or current activities of the user.

FIG. 15 illustrates an activity history process 1500, in accordance with an embodiment of the invention. As illustrated by block 1502, the financial and social management system 1 receives an indication to identify activity history for one or more activities in the past based on a past time period (e.g., over a date range, specific selected date in the past, automatically every month, six months, a year, or other like date or date range in the past). For example, the first user 4 may request, or be provided automatically, a view of activities that occurred on a particular day in the past, such as on a user's birthday or other day in the past.

As illustrated in block 1504 in FIG. 15, the financial and social management system 1 receives an indication to identify activity history for one or more activities that occurred at a particular location (e.g., in a country, state, city, town, area within a city, area around a particular radius, or the like) either automatically or based on input from the user. For example, when a user enters a particular location, the financial and social management system 1 may automatically identify the user's location and determine all of the activities that occurred in the location in the past. In other embodiments, the user may select a particular location for which to receive activity history.

Block 1506 in FIG. 15 illustrates that the financial and social management system 1 then identifies the one or more activities that meet the past time period and/or the location request from block 1502 and 1504. For example, the financial and social management system 1 identifies all of the transactions that occurred exactly a year ago from the current day. In addition, or alternatively, the one or more activities may be limited by location, such as within a particular city for a time period of two weeks in the past.

As illustrated by block 1508, the financial and social management system 1 displays the one or more activities that meet the activity history along with activity information related to the location, associated users, entities, or categories, as well as images as previously described herein. This information may be stored by the financial institution, however, in some embodiments it may be difficult to store all of this information for all the activities of all of the users, and thus, instead of storing this information, the financial and social management system 1 may access this information again on an as needed basis from the user's social networking accounts, the Internet, or the like as previously described herein.

FIG. 16 illustrates an activity history interface 1600, in accordance with an embodiment of the invention. The activity history interface 1600 includes a date history section 1610 and a location history section 1620. The date history section 1610 may include an image of one or more activities that occurred on a particular date in the past (e.g., illustrated as one year ago). The image illustrated in the date history section 1610 may be stored from the original activity, or otherwise determined as needed in the same or similar way as was previously described with respect to the image integration process 300 illustrated in FIG. 3. Activity information for the activity on the date in the past may be included in place of or along with the image. For example, the amount of the activity 1612, the location of the activity 1614, the users associated with the activity 1616, or categories associated with the activity 1618 may be associated with the image. The activity information, like the image, may have been stored by the institution, or otherwise may be determined as needed, as previously discussed throughout the specification. The activity information may be included along with the image, or otherwise selection features (e.g., icons, links, or the like) may be provided that display the activity information when rolled over or selected by the user, as illustrated in FIG. 16.

The location history section 1620, may include an image of one or more activities that occurred at a particular location in which the user is located (e.g., within 3 miles) or for which the user requested (e.g., activities in city 1). The image illustrated in the location history section 1610 may be stored from the original activity, or otherwise determined as needed in the same or similar way as was previously described with respect to the image integration process 300 illustrated in FIG. 3. Activity information may be included in place of or along with the image. For example, the amount of the activity 1622, the location of the activity 1624, the users associated with the activity 1626, or categories associated with the activity 1628 may be associated with the image. The activity information may be included along with the image, or otherwise selection features (e.g., icons, links, or the like) may be provided that display the activity information when rolled over or selected by the user, as illustrated in FIG. 16.

In some embodiments of the invention the financial and social management system 1 may push, pull, share, export, or otherwise allow other users to view or share at least some of the activity history with other users within or outside of the financial and social managements system 1. The activity history of the first user 4 may be sent to other users (e.g., second user 6). For example, if a first user 4 went to dinner with a second user 6 on the first user's birthday a year ago, a portion or all of the activity history related to the restaurant, images, users, amount spent, or other activity information may be made available to the second user 6 as a reminder of the activities of the first user 4 and second user 6 in the past.

In addition to sending activity history that may be shared between users, sponsored offers (e.g., coupon, discount, rebate, price reduction, or the like) may be sent to the first user and/or the other users associated with the activity history information. The financial and social management system may provide an offer to the first user 4 or the second user 6 when the activity information is shared. For example, the restaurant at which the users were located may provide an offer to the users through the financial and social management system 1 when it is determined that the users have not participated in any activities at the restaurant in the last three months. The financial and social management system 1 may provide activity history related to the experience of the users at the restaurant along with the offer in order to provide a more personalized offer to the users.

FIG. 17 illustrates an activity review process 1700, in accordance with an embodiment of the invention. As illustrated by block 1702 in FIG. 17, the financial and social management system 1 identifies a time period for which to provide activity review information for one or more activities. The activity review information may be provided automatically or based on input from a user. For example, the financial and social management system 1 may automatically provide activity review information for the previous year, or the user may request activity review information for the last six months. In other embodiments of the invention any time period may be used or selected (e.g., previous 5 years, 2 years, 1 year, 10 months, 6 months, 3 months, or the like).

As illustrated by block 1704, the financial and social management system 1 may identify the activity information to aggregate over the time period automatically, or based on input from a user. For example, the financial and social management system 1 may automatically identify the first user's largest purchase over the past year, the user with which the first user 4 spent the most money, the one or more categories for which the first user 4 spent the most money, or the like. In other embodiments of the invention the user may select the activity information to aggregate. For example, the first user 4 may select that he would like to view how much money he spent when he was with the second user 6, his largest purchase, the five categories for which the first user 4 spent the most money, or any other like activity review information. Block 1706 of FIG. 17 illustrates that the financial and social management system 1 aggregates the activity information for the one or more activities over the time period based on the location, social relationships, entities, and/or categories. In other embodiments the user may identify a set of aggregated activity information that is interesting, such as by liking, giving a thumbs up, or otherwise approving the aggregated information. As such, the financial and social management system may identify preferences for aggregating specific activity information for a user or a group of users based on the feedback regarding the aggregated information from various users over time.

As illustrated in Block 1708 of FIG. 17, the financial and social management system 1 supplements the aggregated activity information with educational information (e.g., consumption data) regarding the one or more activities. For example, consumption data may identify that the amount of gas purchased by the first user 4 over the span of year may be enough to drive between city 1 and city 2 five times. The educational information may help users to allocate and budget the user's spending habits.

Block 1710 of FIG. 17 illustrates that the financial and social management system 1 displays the aggregated activity information and/or educational information (e.g., consumption data, and the like) to the user in an activity review interface 1800 as illustrated in FIG. 18. The activity review interface 1800 may include one or more expense summary sections 1810 illustrating the expense associated with activities (e.g., the most expensive purchases for the first user 4). The activity review interface 1800 may also include one or more category sections 1820 illustrating the categories of entities, specific entities, categories of products, or specific products that are associated with activities of the user (e.g., coffee shops are where the first user 4 participates in the most activities). The activity review interface 1800 may also include a time section 1830 illustrating the percentage of transactions during a specific time within a day, week, month, or the like for a category, location, user, entity, or the like (e.g., X percent of transactions occur between 11 pm and 2 am. The activity review interface 1800 may further include a social relationship section 1840 that illustrates the users with which the first user 4 spends money, but which may also illustrate the category, location, time, or entity information for the activities as well (e.g., X percentage of the first user's activities associated with a second user 6 are made in restaurants). The activity review interface 1800 may also illustrate the activity information with consumption information such as but not limited to a consumption information section 1850 that illustrates facts or educational information related to the aggregated activity information. For example, the user's gas purchases may be identified and a consumption metric may be applied to the activity to illustrate how far the user has traveled (e.g., the first user's gas purchases could have allowed the first user 4 to drive between city 3 and city 4 five times). In other embodiments, the distances traveled between purchases may be totaled and provided indicating how far the user travels from the user's home to make purchases. In other examples, the amount of coffee plants used to make all of the coffee the user has consumed may be displayed in a consumption information section 1850. The aggregated activity information may include category, location, user, entity, time period, or other like information, alone or in combination with each other for the user's activities over a period of time.

The sections illustrated in the activity review interface 1800 may be interactive to allow a user to drill-down to additional aggregated activity information and consumption information. For example, as illustrated by the consumption interface 1900 in FIG. 19, the financial and social management system 1 may illustrate that based on the aggregated activity information a user drinks on average 3.2 cups of coffee a day which translates to 1,168 cups of coffee a year, which eventually illustrates the number of coffee plants needed to produce the 1,168 cups of coffee a year. Other information may be provided in the consumption interface 1900, such as list of all of the users associated with the first user 4 and the associated amounts spent with each user, or any other type of aggregated activity information.

In some embodiments of the invention aggregated information and the associated educational information (e.g., the consumption information) may be displayed using infographics that include images, video, clips, or other digital content that helps to illustrate the aggregated activity information.

In addition to embodiments of the invention described herein, the financial and social management system 1 may provide deals for activities, packages, past activities, or the like. The deals may be provided in the activity lists, packages, or past activity interfaces described herein.

In some embodiments of the invention the financial and social management system may allow a user to transfer information back to, or share information with the social networking accounts of the user, based in part on the activities in which the user participates. For example, the after a user makes a purchase, and the identity of the product, entity, category, or user is identified from the various sources of information, the financial and social management system 1 may prompt the user if the user would like to "like," support, follow, or otherwise indicate that the user has a relationship with the product (e.g., likes the product), entity (e.g., follows or likes the entity), or user (add the user as a contact in the social networking account of the user). In other examples, the financial and social management system 1 may prompt the user to determine if the user would like to write a review of a product, entity, location, or the like on site that may allow the user to review these types of activities.

Embodiments of the invention are described herein as a financial institution incorporating information from a social networking account. In some embodiments, the interfaces described herein may be displayed through an online banking account controlled by the financial institution. In other embodiments of the invention a social networking institution can incorporate information from the financial institution accounts. In some embodiments, the interfaces described herein may be displayed through the social networking accounts controlled by the social networking institution. In still other embodiments as previously discussed, a third-party can incorporate information from the accounts of the user at financial institutions and social networking institutions into a financial and social management system 1 run by the third-party institution.

FIG. 20 illustrates a financial and social management system 1, in accordance with one embodiment of the invention. As illustrated in FIG. 20, one or more financial institution systems 10 are operatively coupled, via a network 2, to a first user computer system 20, social networking systems 30, a second user computer system 40, entity computer systems 50, or other user computer systems or financial institution systems (not illustrated). In this way users can access the financial and social management application 15, as well as other financial applications 17, in order to perform the actions previously described herein. The financial institution systems 10 are illustrated in FIG. 20 as a single system; however, the financial institution systems 10, may be made up of one or more systems, databases, engines, applications, modules, or the like.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

In some embodiments of the invention the first user 4 and the second user 6 (e.g., customers, clients, employees, agents, contractors, legal representatives, or the like), or other users, may have access to the financial and social management application 15 for tracking and managing user activities.

As illustrated in FIG. 20, the financial institution systems 10 generally comprise a communication device 12, a processing device 14, and a memory device 16. The processing device 14 is operatively coupled to the communication device 12 and the memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 uses the communication device 12 to communicate with the network 2 and other devices on the network 2, such as, but not limited to, the first user computer system 20, the social networking systems 30, the second user computer system 30, and other user computer systems or financial institution systems (e.g., systems of a second financial institution). As such, the communication device 12 generally comprises a modem, server, or other device for communicating with other devices on the network 2.

As further illustrated in FIG. 20, the financial institution systems 10 comprise computer-readable instructions 18 stored in the memory device 16, which in one embodiment includes the computer-readable instructions 18 of financial and social management application 15 or other financial applications 17. In some embodiments, the memory device 16 includes a datastore 19 for storing data related to the financial institution systems 10, including, but not limited to, data created and/or used by the financial and social management application 15 or other financial applications 17.

As illustrated in FIG. 20, the first user 4 may access the financial and social management application 15 through a first user computer system 20. The first user computer system 20 may be a desktop, laptop, tablet, mobile device (e.g., smartphone device, PDA, phone, or other like mobile device), or any other type of computer that generally comprises a communication device 22, a processing device 24, and a memory device 26. The processing device 24 is operatively coupled to the communication device 22, and the memory device 26. The processing device 24 uses the communication device 22 to communicate with the network 2 and other devices on the network 2, such as, but not limited to, the financial institution systems 10, social networking systems 30, the second user computer system 40, entity computer systems 50, and/or other systems. As such, the communication device 22 generally comprises a modem, server, or other device for communicating with other devices on the network 2 and/or a keypad, keyboard, touch-screen, touchpad, microphone, mouse, joystick, other pointer device, button, soft key, and/or other input device(s) for communicating with the first user 4.

As illustrated in FIG. 20, the first user computer system 20 may have computer-readable instructions 28 stored in the memory device 26, which in one embodiment includes the computer-readable instructions 28 of a web browser or application 27, or other like tool, that allows the first user 4 to access the financial and social management application 15, or the other financial applications 15. In some embodiments, the memory device 26 includes a datastore 29 for storing data related to the first user computer system 20, including but not limited to data created and/or used by the web browser or application 27.

As illustrated in FIG. 20, the social networking systems 30 generally comprise a communication device 32, a processing device 34, and a memory device 36. The processing device 34 is operatively coupled to the communication device 32 and the memory device 36. The processing device 34 uses the communication device 32 to communicate with the network 2 and other devices on the network 2, such as, but not limited to, the financial institution systems 10, the first user computer system 20, the second user computer system 40, entity computer systems 50, other user systems, and/or other financial institution systems. As such, the communication device 32 generally comprises a modem, server, or other device for communicating with other devices on the network 2.

As further illustrated in FIG. 20, the social networking systems 30 comprise computer-readable instructions 38 stored in the memory device 36, which in one embodiment includes the computer-readable instructions 38 of a social networking application 37, or other like tool, which users can use to access, or otherwise allow the financial institution (e.g., financial and social management application 15) to access, the users' social networking accounts. In some embodiments, the memory device 36 includes a datastore 39 for storing data related to the social networking systems 30, including but not limited to data created and/or used by the social networking application 37.

As further illustrated in FIG. 20, the second user computer system 40 communicates with the network 2 and other devices on the network 2, such as, but not limited to, the financial institution systems 10, the first user computer system 20, the social networking systems 30, the entity computer systems 50, and/or other user systems, other financial institution systems, or other types of systems. The second user computer system 40, and other user computer systems, have the same or similar devices as described with respect to the first user computer systems 20, and as such operate in the same way as discussed with respect to the first user computer system 20.

FIG. 20 further illustrates that entity computer systems 50 communicate with the network 2 and other devices on the network 2, such as, but not limited to, the financial institution systems 10, the first user computer system 20, the social networking systems 30, the second user computer system 40, other user computer systems, other financial institution systems, and/or other systems. The entity computer systems 50, have the same or similar devices as described with respect to the financial institution systems 10 and social networking systems 30, and as such, operate in the same way as discussed with respect to the financial institution systems 10 and social networking systems 30 (or the user computer systems).

As previously indicated, in some embodiments of the invention the financial and social management application 15, may be located completely or partially on the financial institution systems 10, first user computer system 20, social networking systems 30, second user computer system 40, entity computer systems 50, other user systems, other financial institution systems, or other systems not specifically illustrated or described with respect to FIG. 20. For example, a portion of the financial and social management application 15 may be stored on mobile device of the users, such as an application on user mobile devices that allows the user to access information stored in the financial institution systems 10, the social networking systems 3, the entity computer systems 50, or information on other financial institution systems, or other like systems.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

U.S. patent application Ser. No. 14/032,464 to Votaw, entitled "Financial and Social Management System," U.S. patent application Ser. No. 14/032,537 to Votaw, entitled "Activity List Enhanced With Images For a Financial and Social Management System," U.S. patent application Ser. No. 14/032,594 to Votaw, entitled "Activity List Tagged With Activity Information For a Financial and Social Management System," U.S. patent application Ser. No. 14/032,741 to Votaw, entitled "Linking Users and Activities Through Transactions Through Activity Information in a Financial and Social Management System," U.S. patent application Ser. No. 14/032,602 to Votaw, entitled "Activity List Linked with Receipts for a Financial and Social Management System," U.S. patent application Ser. No. 14/032,686 to Votaw, entitled "Activity List Filters For a Financial and Social Management System," U.S. patent application Ser. No. 14/032,991 to Votaw, entitled "Past Packages For a Financial and Social Management System," U.S. patent application Ser. No. 14/033,024 to Votaw, entitled "Proposed Packages For a Financial and Social Management System," U.S. patent application Ser. No. 14/032,661 to Votaw, entitled "Grouped Packages For a Financial and Social Management System," U.S. patent application Ser. No. 14/032,655 to Votaw, entitled "Activity History For a Financial and Social Management System," and U.S. patent application Ser. No. 14/032,646 to Votaw, entitled "Interactive Map for Grouped Activities Within a Financial and Social Management System," were all filed Sep. 20, 2013, and are all hereby incorporated by reference in their entirety.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for providing an activity review of a first user in an activity review interface based on aggregated activity information from one or more financial accounts and one or more social networking accounts, the system comprising:
   one or more memory devices having computer readable program code store thereon; and
   one or more processing devices operatively coupled to the one or more memory devices, wherein the one or more processing devices are configured to execute the computer readable program code to:
   receive an indication to identify and aggregate activity information for activities over a time period, wherein the activities are transactions made by the first user with one or more financial accounts and the activity information is financial account information captured from the one or more financial accounts and is supplemented with social networking information captured from the one or more social networking accounts;
   identify the activities that meet the time period;
   aggregate the activity information for the activities, wherein aggregating the activity information comprises:
   aggregating the activity information related to locations involved in the activities;
   aggregating the activity information related to social relationships involved in the activities, wherein the social relationships are determined by determining the locations and times of the transactions from the one or more financial accounts of the first user;
   accessing the one or more social networking accounts of the first user;
   determining other users associated with the locations and the times of the transactions within the one or more social networking accounts; and
   associating the other users with the activities of the first user;
   aggregating the activity information related to entities involved in the activities; and
   aggregating the activity information related to categories involved in the activities; and
   capture at least one location image associated with at least one of the locations, wherein the at least one location image is captured by:
   accessing the one or more social networking accounts of the first user;
   capturing a location image from the one or more social networking accounts, wherein the location image is associated with at least one of the locations within the social networking account;
   capture at least one user image of at least one of the other users associated with the social relationships, wherein the at least one user image is captured by:
   accessing the one or more social networking accounts of the first user;
   capturing a user image from the one or more social networking accounts, wherein the user image is associated with at least one of the other users; and
   capture at least one entity image associated with at least one of the entities, wherein an entity image is captured from an electronic source;
   capture at least one category image associated with at least one of the categories, wherein a category image is captured from an electronic source; and
   display the aggregated activity information for the activities related to the locations, the social relationships, the entities, and the categories in the activity review interface along with the location image, the user image, the entity image, and the category image on a display of the first user computer system.

2. The system of claim 1, wherein the one or more processing devices are configured to execute the computer readable program code to:
   supplement the aggregated activity information with educational information related to the activities.

3. The system of claim 2, wherein the educational information is consumption information related to the activities.

4. The system of claim 1, wherein the activity review interface is an integrated interface comprising the activity information captured and combined from the one or more financial accounts and one or more social networking accounts of the first user, and images from the one or more social networking accounts, and websites.

5. The system of claim 1, wherein the one or more processing devices configured to execute the computer readable program code to aggregate the activity information for the activities comprises:
   aggregating the activity based on a time of day of the one or more activities.

6. The system of claim 1, wherein the one or more processing devices configured to execute the computer readable program code to receive the indication to identify and aggregate the activity information for the activities over the past time period comprises:
   receiving an indication from the first user identifying the locations, the social relationships, the entities, and the categories to aggregate; and receiving the time period from the first user over which to aggregate the activity information.

* * * * *